United States Patent
Li et al.

(10) Patent No.: US 12,375,663 B2
(45) Date of Patent: Jul. 29, 2025

(54) METHODS AND SYSTEMS FOR PERFORMING COMBINED INTER AND INTRA PREDICTION

(71) Applicant: Alibaba Innovation Private Limited, Singapore (SG)

(72) Inventors: Xinwei Li, San Mateo, CA (US); Ru-Ling Liao, San Mateo, CA (US); Jie Chen, San Mateo, CA (US); Yan Ye, San Mateo, CA (US)

(73) Assignee: Alibaba Innovation Private Limited, Singapore (SG)

( * ) Notice: Subject to any disclaimer, the term of this patent is extended or adjusted under 35 U.S.C. 154(b) by 177 days.

(21) Appl. No.: 17/808,212

(22) Filed: Jun. 22, 2022

(65) Prior Publication Data

US 2022/0417511 A1    Dec. 29, 2022

Related U.S. Application Data

(60) Provisional application No. 63/235,110, filed on Aug. 19, 2021, provisional application No. 63/215,474, filed on Jun. 27, 2021.

(51) Int. Cl.
*H04N 19/105* (2014.01)
*H04N 19/119* (2014.01)
*H04N 19/159* (2014.01)
*H04N 19/176* (2014.01)
*H04N 19/46* (2014.01)

(52) U.S. Cl.
CPC ......... *H04N 19/119* (2014.11); *H04N 19/105* (2014.11); *H04N 19/159* (2014.11); *H04N 19/176* (2014.11); *H04N 19/46* (2014.11)

(58) Field of Classification Search
CPC .. H04N 19/119; H04N 19/105; H04N 19/159; H04N 19/176; H04N 19/46
See application file for complete search history.

(56) References Cited

U.S. PATENT DOCUMENTS

2019/0215521 A1    7/2019   Chuang et al.
2020/0322623 A1 *  10/2020  Chiang ................. H04N 19/46

FOREIGN PATENT DOCUMENTS

WO    WO 2020/187328 A1    9/2020
WO    WO-2022222990 A1 *  10/2022  .......... H04N 19/105
WO    WO-2022253319 A1 *  12/2022

OTHER PUBLICATIONS

"Requirements for a Future Video Coding Standard v5," International Organisation for Standardisation, Torino, IT, 14 pages (2017).

(Continued)

*Primary Examiner* — Patrick E Demosky
(74) *Attorney, Agent, or Firm* — Finnegan, Henderson, Farabow, Garrett & Dunner, LLP

(57) ABSTRACT

A method for performing combined inter and intra prediction (CIIP) includes determining the CIIP being enabled for a target block; determining a first intra prediction mode of the target block using a template-based intra mode derivation (TIMD) method; generating an intra predictor of the target block with the first intra prediction mode; and obtaining a final predictor of the target block by weighted averaging the intra predictor of the target block and an inter predictor of the target block.

16 Claims, 20 Drawing Sheets

(56) References Cited

OTHER PUBLICATIONS

Cao et al., "EE2-Related: Improvements of Decoder-Side Intra Mode Derivation," JVET-W0123-v2, 23$^{rd}$ meeting, by teleconference, Jul. 7-16, 2021, 4 pages.

Chang et al., "Compression efficiency methods beyond VVC," JVET-U0100, 21$^{st}$ Meeting, by teleconference, Jan. 6-15, 2021, 13 pages.

Chen et al., "Algorithm Description of Joint Exploration Test Model 7 (JEM 7)," JVET-G1001-v1, 7$^{th}$ Meeting: Torino, IT, Jul. 13-21, 2017, 50 pages.

Chen et al., "Algorithm description for Versatile Video Coding and Test Model 11 (VTM 11)," JVET-T2002-v1, 20$^{th}$ meeting by teleconference, Oct. 7-16, 2020, 104 pages.

Chiang et al., "CE10.1.1: Multi-hypothesis prediction for improving AMVP mode, skip or merge mode, and intra mode," JVET-L0100-v3, 12$^{th}$ meeting, Macao, CN, Oct. 3-12, 2018, 15 pages.

International Telecommunications Union "Series H: Audiovisual and Multimedia Systems Infrastructure of audiovisual services—Coding of moving video", ITU-T Telecommunication Standardization Sector of ITU, Apr. 2013, 317 pages.

Jem, https://jvet.hhi.fraunhofer.de/svn/svn_HMJEMSoftware.

Sullivan et al., "Overview of the High Efficiency Video Coding (HEVC) Standard," IEE Transactions on Circuits and Systems for Video Technology, vol. 22, No. 12, pp. 1649-1668 (2012).

Zhao et al., "EE2-Related: Improvements of Decoder-Side Intra Mode Derivation," JVET-V0087, 22$^{nd}$ Meeting, by teleconference, Apr. 20-28, 2021, 5 pages.

Li et al., "EE2-related: A combination of CIIP and DIMD/TIMD," JVET-W0068-v1, 23$^{rd}$ Meeting, by teleconference, Jul. 7-16, 2021, 5 pages.

Wang et al., "EE2-related: Template-based intra mode derivation using MPMs," JVET-V0098, 22$^{nd}$ Meeting, by teleconference, Apr. 20-28, 2021, 4 pages.

Xiu et al., "Decoder-side intra mode derivation," JVET-C0061, 3$^{rd}$ Meeting: Geneva, CH, May 26-Jun. 1, 2016, 5 pages.

European Patent Office Communication issued for Application No. 22833779.6 the Supplementary European Search Report and the European search opinion dated Sep. 13, 2024, 11 pages.

* cited by examiner

METHODS AND SYSTEMS FOR PERFORMING COMBINED INTER AND INTRA PREDICTION

CROSS-REFERENCE TO RELATED APPLICATIONS

The disclosure claims the benefits of priority to U.S. Provisional Application No. 63/215,474, filed on Jun. 27, 2021, and U.S. Provisional Application No. 63/235,110, filed on Aug. 19, 2021, both of which are incorporated herein by reference in their entireties.

TECHNICAL FIELD

The present disclosure generally relates to video processing, and more particularly, to methods and systems for performing combined inter and intra prediction.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (HEVC/H.265) standard, the Versatile Video Coding (VVC/H.266) standard, and AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

Embodiments of the present disclosure provide a method for performing combined inter and intra prediction (CIIP). The method includes determining the CIIP being enabled for a target block; determining a first intra prediction mode of the target block using a template-based intra mode derivation (TIMD) method; generating an intra predictor of the target block with the first intra prediction mode; and obtaining a final predictor of the target block by weighted averaging the intra predictor of the target block and an inter predictor of the target block.

Embodiments of the present disclosure provide a method for performing combined inter and intra prediction (CIIP). The method includes: determining a first intra prediction mode of a target block using a template-based intra mode derivation (TIMD) method; generating an intra predictor of the target block with the first intra prediction mode; obtaining a final predictor of the target block by weighted averaging the intra predictor of the target block and an inter predictor of the target block; and signaling a flag indicating the CIIP being enabled and an index indicating the TIMD method is used for determining the first intra prediction mode of the target block.

Embodiments of the present disclosure provide a non-transitory computer-readable storage medium storing a bitstream, wherein the bitstream comprises a flag and a first index associated with encoded video data, the flag indicating an inter and intra prediction (CIIP) is used for the encoded video data, and the first index indicating a template-based intra mode derivation (TIMD) method used for the CIIP, wherein the flag and the index cause a decoder to: determine a first intra prediction mode of a target block using the TIMD method; generate an intra predictor of the target block with the intra prediction mode; and obtain a final predictor of the target block by weighted averaging the intra predictor of the target block and an inter predictor of the target block).

BRIEF DESCRIPTION OF THE DRAWINGS

Embodiments and various aspects of the present disclosure are illustrated in the following detailed description and the accompanying figures. Various features shown in the figures are not drawn to scale.

FIGS. 17A and 17B illustrate exemplary methods for splitting a coding block in vertical and horizontal respectively, according to some embodiments of the present disclosure.

DETAILED DESCRIPTION

Figure 1:
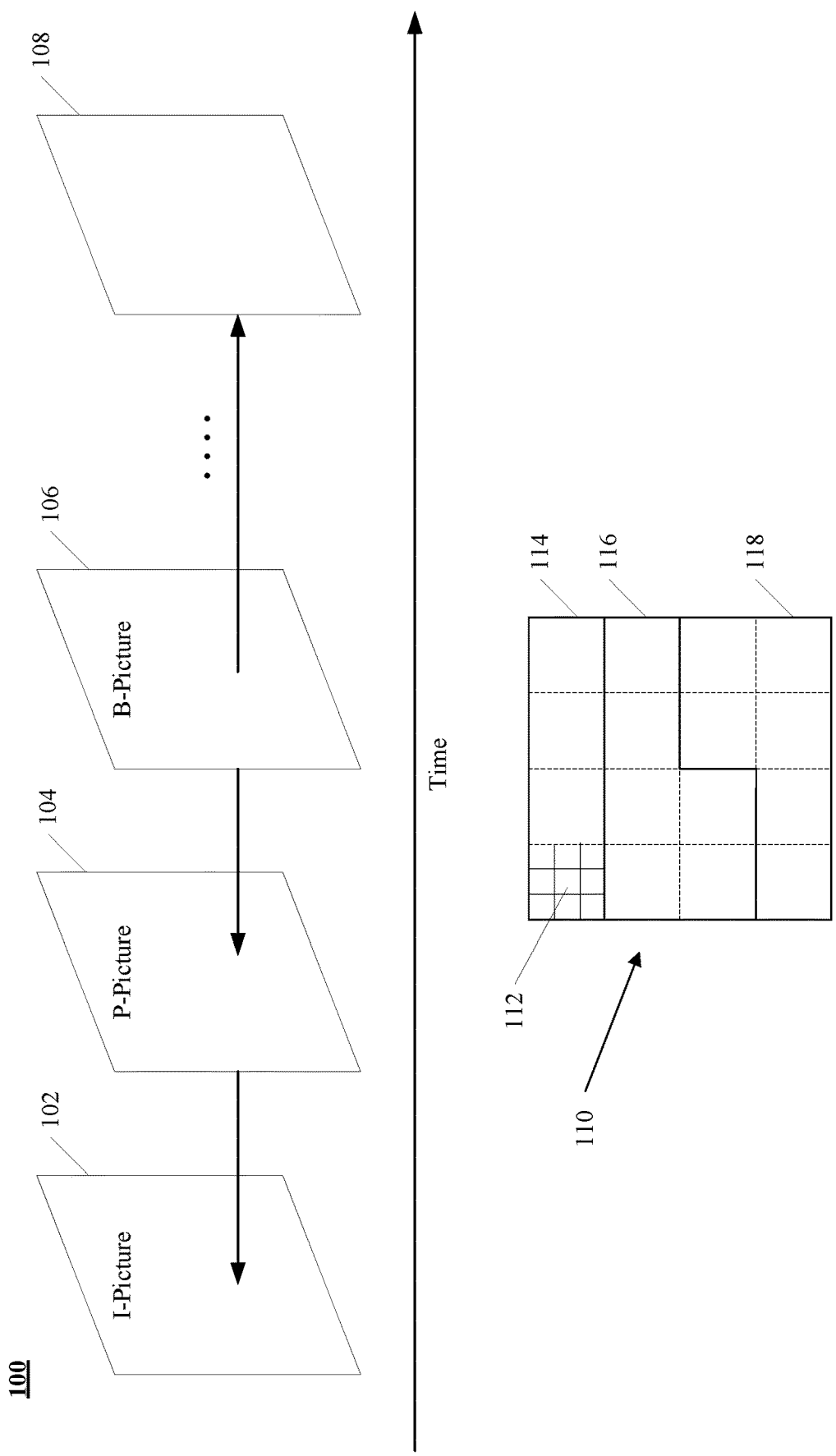
FIG. 1 is a schematic diagram illustrating structures of an example video sequence, according to some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

The Joint Video Experts Team (JVET) of the ITU-T Video Coding Expert Group (ITU-T VCEG) and the ISO/IEC Moving Picture Expert Group (ISO/IEC MPEG) is currently developing the Versatile Video Coding (VVC/H.266) standard. The VVC standard is aimed at doubling the compression efficiency of its predecessor, the High Efficiency Video Coding (HEVC/H.265) standard. In other words, VVC's goal is to achieve the same subjective quality as HEVC/H.265 using half the bandwidth.

To achieve the same subjective quality as HEVC/H.265 using half the bandwidth, the JVET has been developing technologies beyond HEVC using the joint exploration model (JEM) reference software. As coding technologies were incorporated into the JEM, the JEM achieved substantially higher coding performance than HEVC.

The VVC standard has been developed recent, and continues to include more coding technologies that provide better compression performance. VVC is based on the same hybrid video coding system that has been used in modern video compression standards such as HEVC, H.264/AVC, MPEG2, H.263, etc.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

The useful information of a picture being encoded (referred to as a "current picture") include changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the current picture.

A picture coded without referencing another picture (i.e., it is its own reference picture) is referred to as an "I-picture." A picture is referred to as a "P-picture" if some or all blocks (e.g., blocks that generally refer to portions of the video picture) in the picture are predicted using intra prediction or inter prediction with one reference picture (e.g., uni-prediction). A picture is referred to as a "B-picture" if at least one block in it is predicted with two reference pictures (e.g., bi-prediction).

FIG. 1 illustrates structures of an example video sequence 100, according to some embodiments of the present disclosure. Video sequence 100 can be a live video or a video having been captured and archived. Video 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. For example, the reference picture of picture 104 can be a picture preceding picture 102. It should be noted that the reference pictures of pictures 102-106 are only examples, and the present disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in the present disclosure. For example, structure 110 in FIG. 1 shows an example structure of a picture of video sequence 100 (e.g., any of pictures 102-108). In structure 110, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC or H.266/VVC). The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266/VVC). Any operation performed to a basic processing unit can be repeatedly performed to each of its luma and chroma components.

Video coding has multiple stages of operations, examples of which are shown in FIGS. 2A-2B and FIGS. 3A-3B. For each stage, the size of the basic processing units can still be too large for processing, and thus can be further divided into segments referred to as "basic processing sub-units" in the present disclosure. In some embodiments, the basic processing sub-units can be referred to as "blocks" in some video coding standards (e.g., MPEG family, H.261, H.263, or H.264/AVC), or as "coding units" ("CUs") in some other video coding standards (e.g., H.265/HEVC or H.266/VVC). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

Figure 2A:
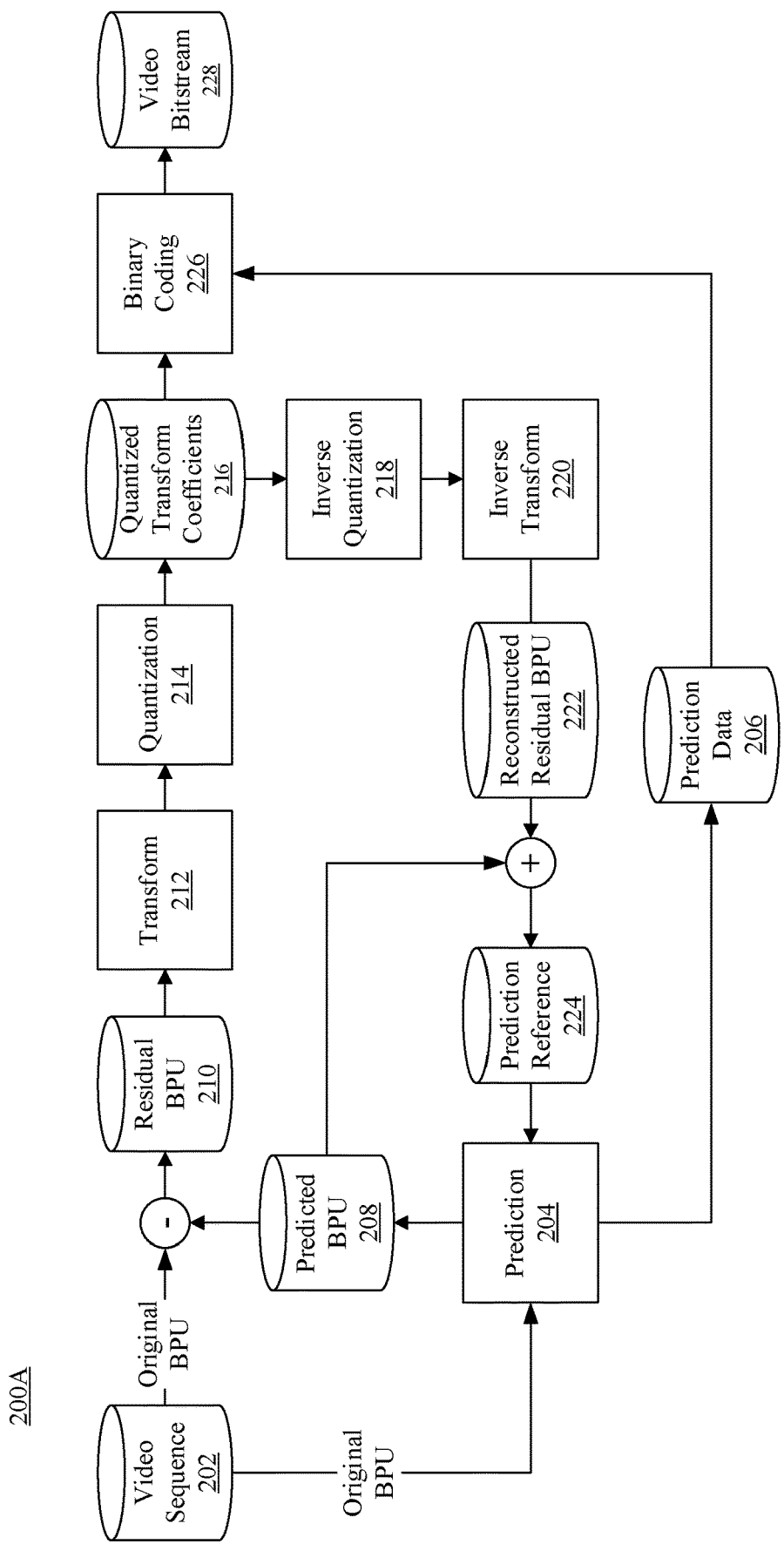
FIG. 2A is a schematic diagram illustrating an exemplary encoding process of a hybrid video coding system, consistent with embodiments of the disclosure.
Figure 2B:
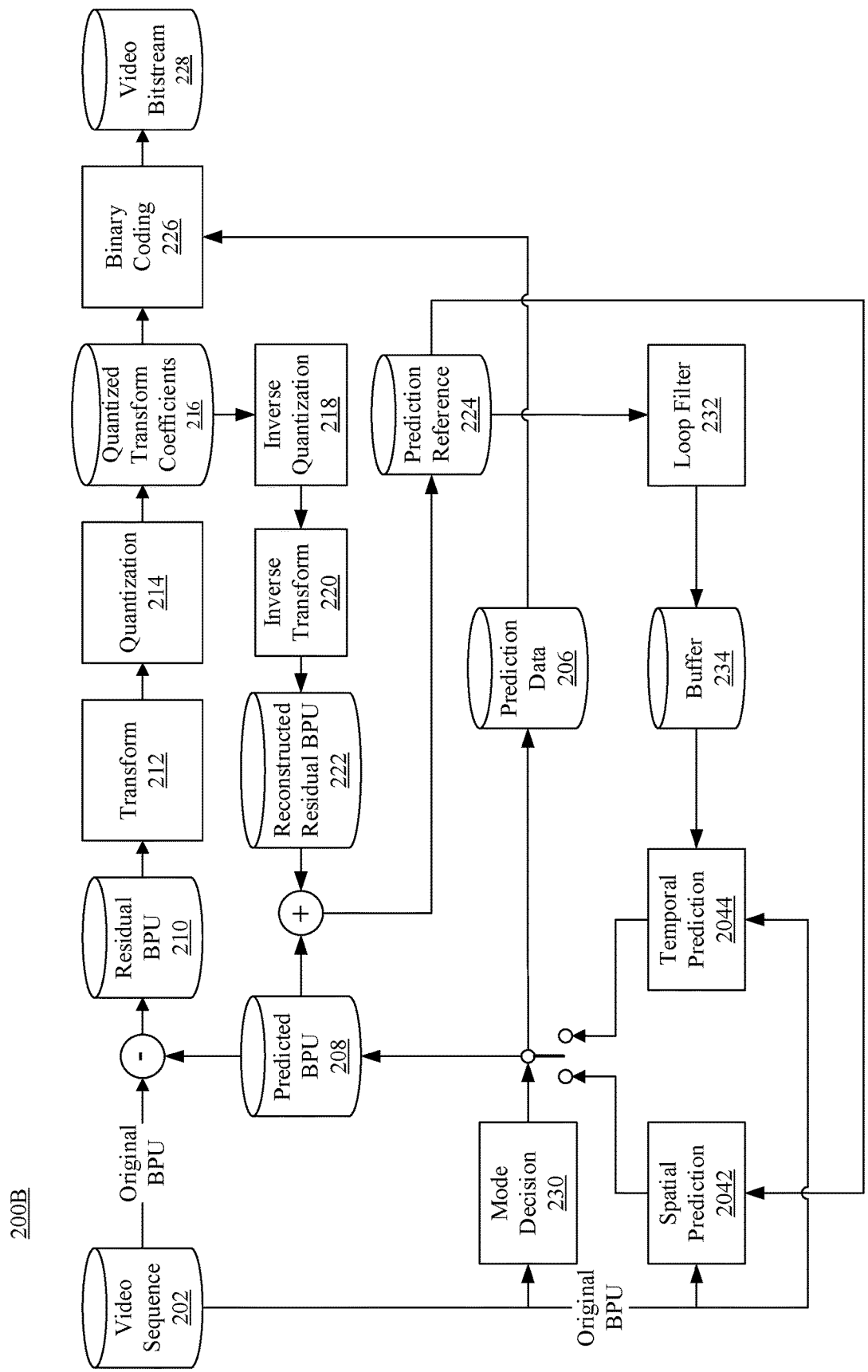
FIG. 2B is a schematic diagram illustrating another exemplary encoding process of a hybrid video coding system, consistent with embodiments of the disclosure.

For example, at a mode decision stage (an example of which is shown in FIG. 2B), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC or H.266/VVC), and decide a prediction type for each individual basic processing sub-unit.

For another example, at a prediction stage (an example of which is shown in FIGS. 2A-2B), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC or H.266/VVC), at the level of which the prediction operation can be performed.

For another example, at a transform stage (an example of which is shown in FIGS. 2A-2B), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC or H.266/VVC), at the level of which the transform operation can be performed. It should be noted that the division schemes of the same basic processing sub-unit can be different at the prediction stage and the transform stage. For example, in H.265/HEVC or H.266/VVC, the prediction blocks and transform blocks of the same CU can have different sizes and numbers.

In structure 110 of FIG. 1, basic processing unit 112 is further divided into 3×3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC and H.266/VVC provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and the present disclosure does not limit embodiments thereof.

FIG. 2A illustrates a schematic diagram of an example encoding process 200A, consistent with embodiments of the disclosure. For example, the encoding process 200A can be performed by an encoder. As shown in FIG. 2A, the encoder can encode video sequence 202 into video bitstream 228 according to process 200A. Similar to video sequence 100 in FIG. 1, video sequence 202 can include a set of pictures (referred to as "original pictures") arranged in a temporal order. Similar to structure 110 in FIG. 1, each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions (e.g., regions 114-118) of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization scale factor")

and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

FIG. 2B illustrates a schematic diagram of another example encoding process 200B, consistent with embodiments of the disclosure. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline (e.g., as shown in FIG. 1), it can be deemed that the matching region "moves" to the location of the original BPU as time goes by. The encoder can record the direction and distance of such a motion as a "motion vector." When multiple reference pictures are used (e.g., as picture 106 in FIG. 1), the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used (e.g., as picture 106 in FIG. 1), the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. For example, picture 104 in FIG. 1 is a unidirectional inter-predicted picture, in which the reference picture (e.g., picture 102) precedes picture 104. Bidirectional inter predictions can use one or more reference pictures at both temporal directions with respect to the current picture. For example, picture 106 in FIG. 1 is a bidirectional inter-predicted picture, in which the reference pictures (e.g., pictures 104 and 108) are at both temporal directions with respect to picture 104.

Still referring to the forward path of process 200B, after spatial prediction 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). The encoder can feed prediction reference 224 to loop filter stage 232, at which the encoder can apply a loop filter to prediction reference 224 to reduce or eliminate distortion (e.g., blocking artifacts) introduced during coding of the prediction reference 224. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
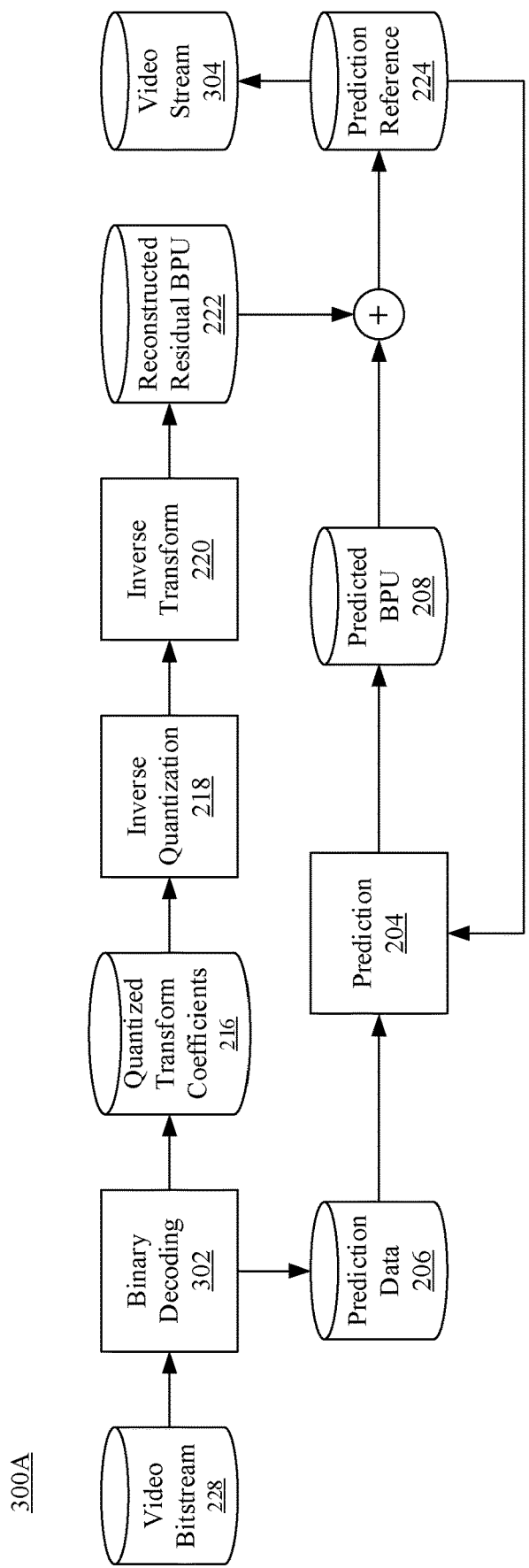
FIG. 3A is a schematic diagram illustrating an exemplary decoding process of a hybrid video coding system, consistent with embodiments of the disclosure.

FIG. 3A illustrates a schematic diagram of an example decoding process 300A, consistent with embodiments of the disclosure. Process 300A can be a decompression process corresponding to the compression process 200A in FIG. 2A. In some embodiments, process 300A can be similar to the reconstruction path of process 200A. A decoder can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions (e.g., regions 114-118) of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
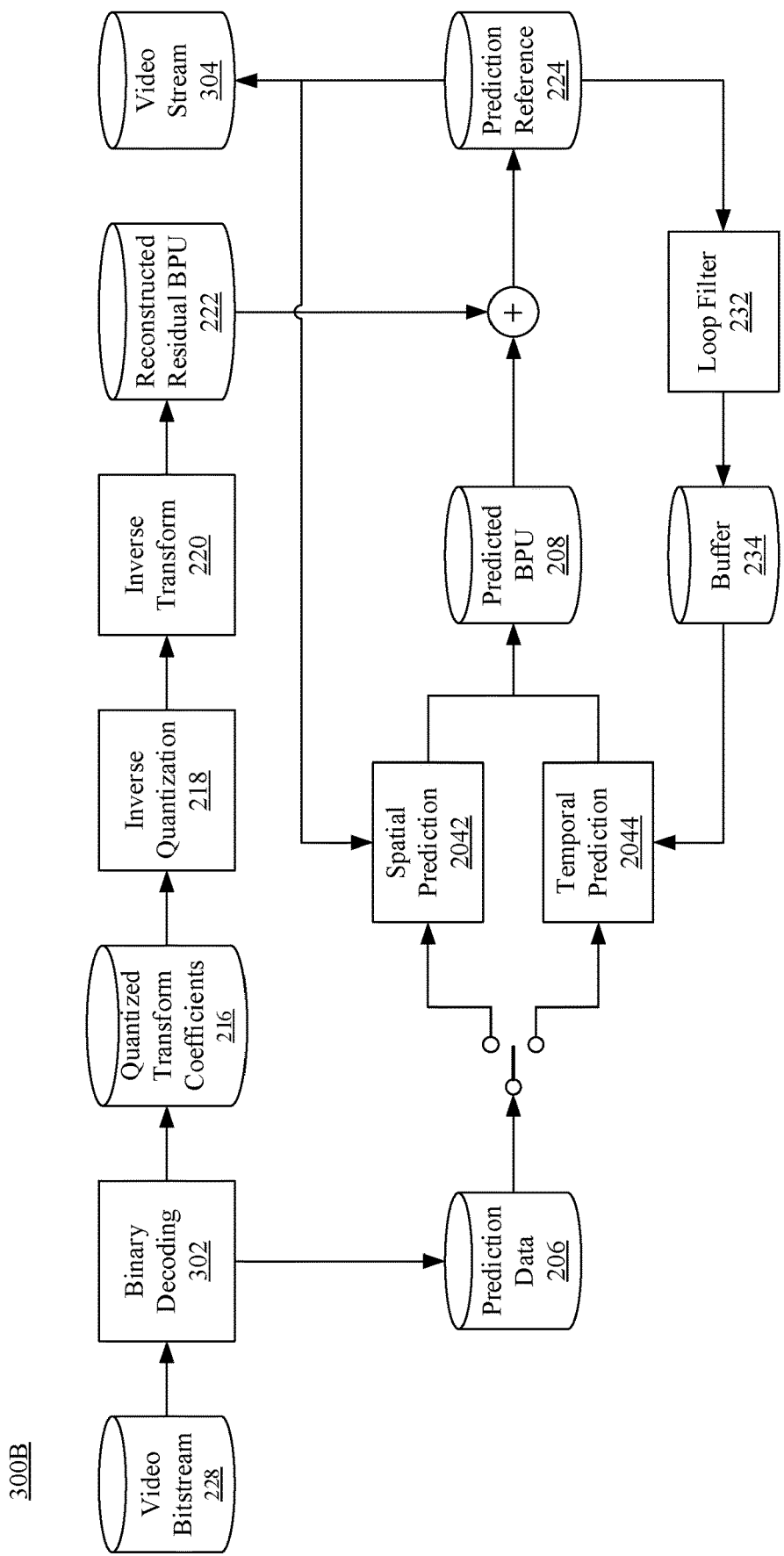
FIG. 3B is a schematic diagram illustrating another exemplary decoding process of a hybrid video coding system, consistent with embodiments of the disclosure.

FIG. 3B illustrates a schematic diagram of another example decoding process 300B, consistent with embodiments of the disclosure. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the decoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, prediction data can further include parameters of the loop filter (e.g., a loop filter strength). In some embodiments, prediction data includes parameters of the loop filter when the prediction mode indicator of prediction data 206 indicates that inter prediction was used to encode the current BPU.

Figure 4:
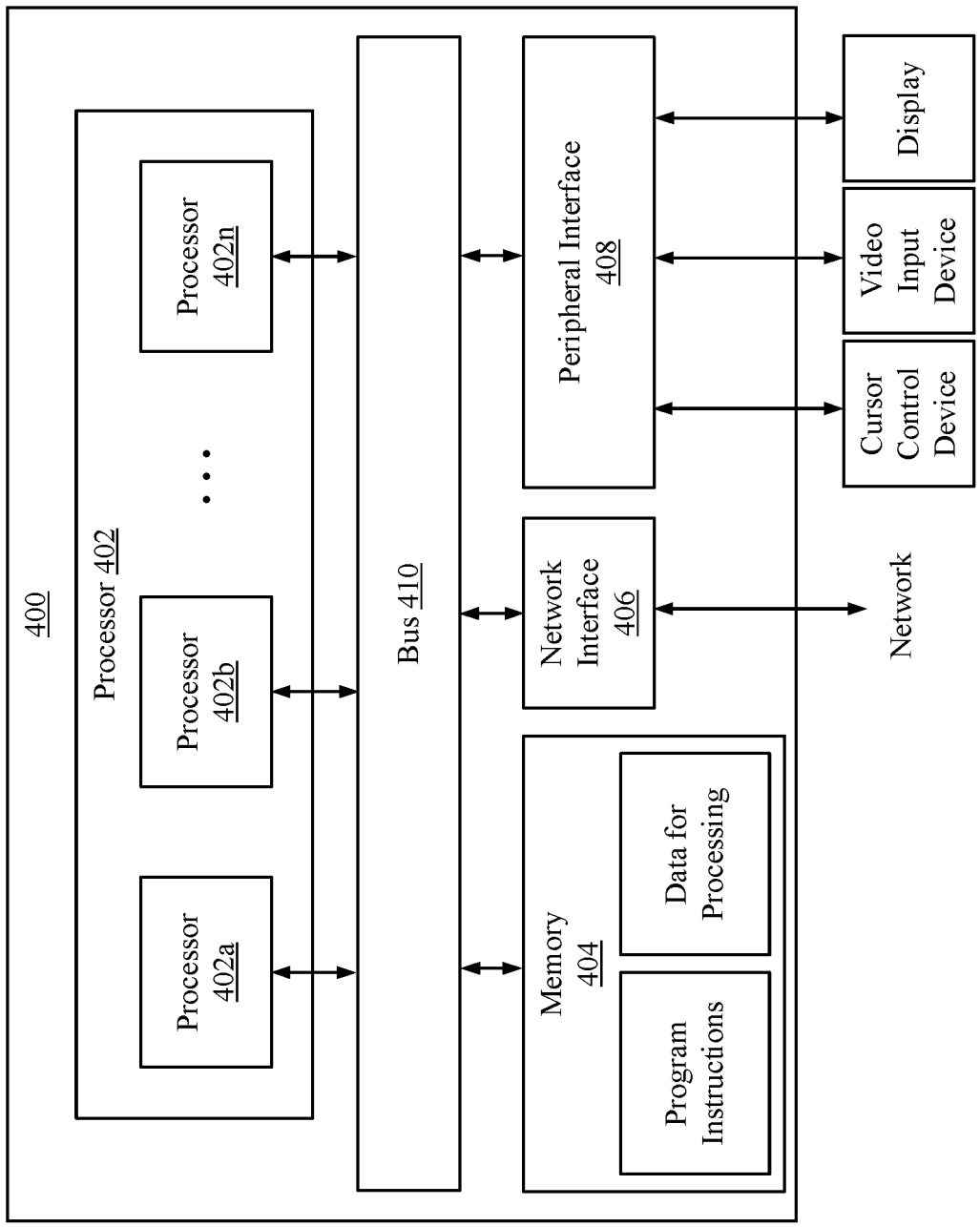
FIG. 4 is a block diagram of an exemplary apparatus for encoding or decoding a video, according to some embodiments of the present disclosure.

FIG. 4 is a block diagram of an example apparatus 400 for encoding or decoding a video, consistent with embodiments of the disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like.

Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, an near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

Figure 5:
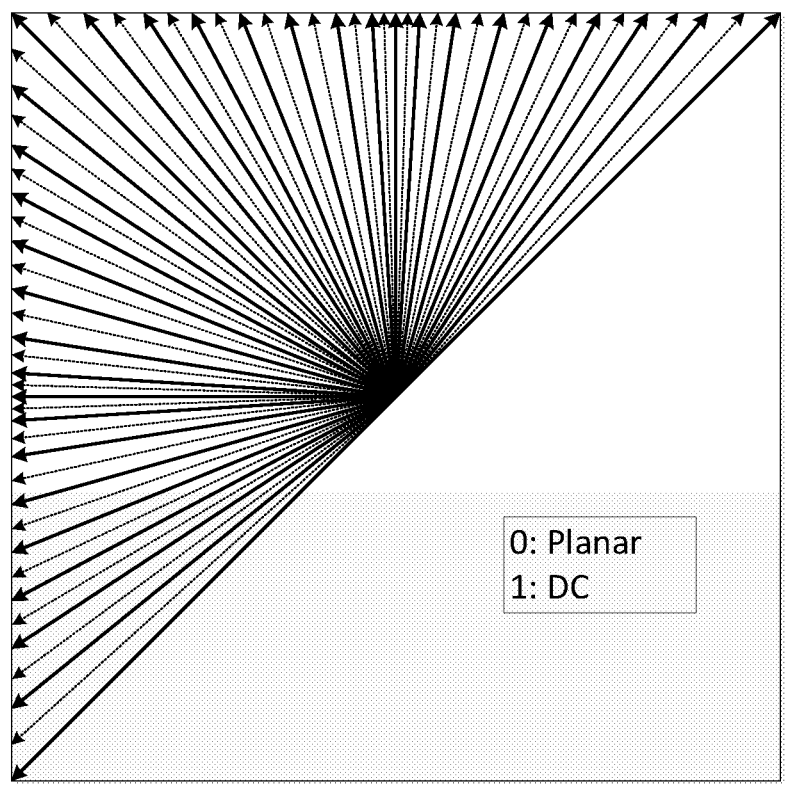
FIG. 5 illustrates angular intra prediction modes in VVC, according to some embodiments of the present disclosure.

Multiple intra prediction modes are provided in VVC. FIG. 5 illustrates angular intra prediction modes in VVC, according to some embodiments of the present disclosure. As shown in FIG. 5, to capture the arbitrary edge directions presented in natural video, the number of angular intra prediction modes in VVC is extended from 33, as used in HEVC, to 65, where the directional modes not in HEVC are depicted as dotted arrows.

The VVC standard implements two non-angular intra prediction modes: DC and Planar modes (as in HEVC). In the DC intra prediction mode, a mean sample value of the reference samples to the block is used for prediction generation. In VVC, the reference samples only along the longer side of a rectangular block are used to calculate the mean value, while for square blocks reference samples from both left and above sides are used. In the Planar mode, the predicted sample values are obtained as a weighted average of 4 reference sample values. The reference samples in the same row or column as the current sample and the reference samples on the bottom-left and on the top-right position with respect to the current block. The 65 angular modes and the two non-angular modes can be referred to as regular intra prediction mode.

In some embodiments, a most probable mode list (MPM) is proposed. As discussed above, there are 67 angular modes in VVC. If the prediction mode of each block is encoded separately, 7 bits are required to encode the 67 modes. Therefore, a method of constructing the most probable mode (MPM) list is adopted in VVC. In image and video coding, adjacent blocks usually have strong correlation, so there is a high probability that the intra prediction modes of adjacent blocks are the same or similar. Therefore, the MPM list is constructed based on the intra prediction modes of left adjacent block and upper adjacent block. In VVC, the length of its MPM list is 6. In order to keep a low complexity of the MPM list generation, an intra prediction mode coding method with 6 MPMs, which is derived from two available neighboring intra prediction modes, is used.

A unified 6-MPM list, which is also referred to as primary MPM (PMPM) list, is used for intra blocks irrespective of whether MRL (Multiple Reference Line) and ISP (Intra Sub-Partitions) coding tools are applied or not. The MPM list is constructed based on intra modes of the left and above neighboring blocks. Supposing that the intra mode of the left block is denoted as "Left" and the intra mode of the above block is denoted as "Above," the unified 6-MPM list is constructed as follows. When a neighboring block is not available, the intra prediction mode is set to "Planar" by default. If both modes Left and Above are non-angular modes, MPM list is set to {Planar, DC, V, H, V−4, V+4}, where V is referred to as to vertical mode, and H is referred to as to horizontal mode. If one of modes Left and Above is angular mode, and the other is non-angular, set a mode Max as the larger mode in Left and Above, and MPM list is set to {Planar, Max, Max−1, Max+1, Max−2, Max+2}. If Left and Above are both angular and they are different, set a mode "Max" as the larger mode in Left and Above, and set a mode "Min" as the smaller mode in Left and Above. If Max−Min is equal to 1, MPM list is set to {Planar, Left, Above, Min−1, Max+1, Min−2}; otherwise, if Max−Min is greater than or equal to 62, MPM list is set to {Planar, Left, Above, Min+1, Max−1, Min+2}. If Max−Min is equal to 2, MPM list is set to {Planar, Left, Above, Min+1, Min−1, Max+1}; otherwise, MPM list is set to {Planar, Left, Above, Min−1, Min+1, Max−1}. If Left and Above are both angular and they are the same, MPM list is set to {Planar, Left, Left-1, Left+1, Left-2, Left+2}. Moreover, the first bin of the MPM index codeword is CABAC (Context-based Adaptive Binary Arithmetic Coding) context coded. Total three contexts are used, corresponding to whether the current intra block is MRL enabled, ISP enabled, or a normal intra block. For entropy coding of the 61 non-MPM modes, a TBC (Truncated Binary Code) is used.

Figure 6:
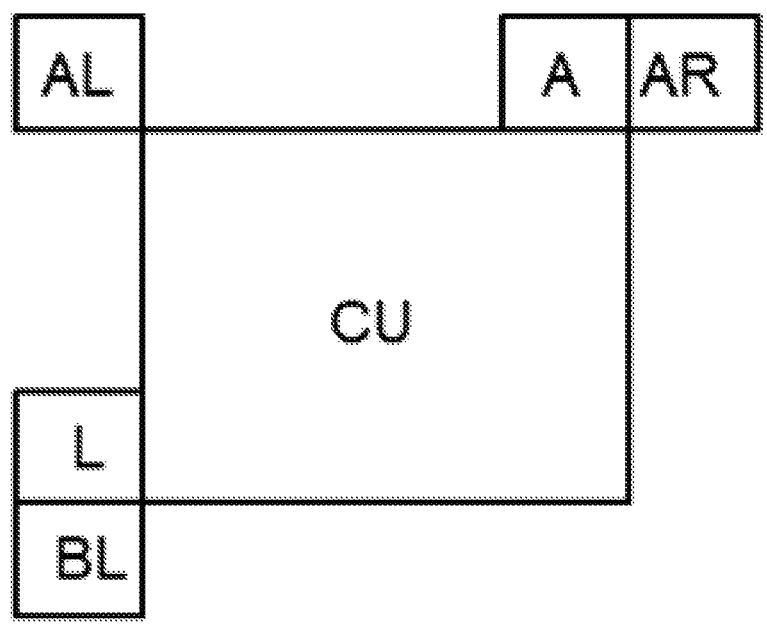
FIG. 6 illustrates exemplary neighboring blocks used in a derivation of a general most probable mode (MPM) list, according to some embodiments of the present disclosure.

In some embodiments, a secondary MPM method can be used. The primary MPM (PMPM) list consists of 6 entries, and the secondary MPM (SMPM) list includes 16 entries. A general MPM list with 22 entries is constructed first, of which the first 6 entries are included into the PMPM list, and the rest of entries form the SMPM list. The first entry in the general MPM list is the Planar mode. Then the intra prediction modes of the neighboring blocks are add into the list. FIG. 6 illustrates exemplary neighboring blocks used in a derivation of a general MPM list, according to some embodiments of the present disclosure. As shown in FIG. 6, the intra prediction modes of the left (L), above (A), below-left (BL), above-right (AR), and above-left (AL) neighboring blocks are used. If a CU block is vertically oriented, the order of neighboring blocks is A, L, BL, AR, AL. Otherwise, i.e., if the CU block is horizontally oriented, the order of neighboring blocks is L, A, BL, AR, AL. Then two decoder-side intra prediction modes are added into the list. Then, the derived angular modes by adding offset from the first two available angular modes of the list are added into the list. Finally, if the list is not complete, default modes are added until the list is complete, that is, has 22 entries. The default mode list is defined as {DC, V, H, V−4, V+4, 14, 22, 42, 58, 10, 26, 38, 62, 6, 30, 34, 66, 2, 48, 52, 16}, according to some embodiments of the present disclosure.

For a decoder, a PMPM flag is parsed first. If the PMPM flag is equal to 1, then a PMPM index is parsed to determine which entry of the PMPM list is selected; otherwise, an SMPM flag is parsed to determine whether to parse an SMPM index for the remaining modes.

In some embodiments, a position dependent intra prediction combination (PDPC) is provided. In VVC, the results of intra prediction are further modified by a PDPC method. PDPC is applied to the following intra prediction modes without signaling: Planar, DC, intra angular modes less than or equal to horizontal modes, and intra angular modes greater than or equal to vertical modes. If the current block is BDPCM (Block-based Delta Pulse Code Modulation) mode or a MRL index is greater than 0, the PDPC is not applied.

A prediction sample pred (x', y') is predicted using an intra prediction mode (e.g., DC, Planar or angular mode) and a linear combination of reference samples according to the following equation:

pred(x',y')=Clip(0, (1<<BitDepth)−1, (wL×R−1,y'+ wT×Rx',−1+(64−wL−wT)×pred(x',y')+32)>>6)

where Rx',−1 and R−1,y' represent the reference samples located at the top and left boundaries of the current sample (x', y'), respectively. The PDPC weights and scale factors are dependent on prediction modes and the block sizes.

Furthermore, a decoder-side intra prediction mode derivation (DIMD) is provided. In the decoder-side intra prediction mode derivation method, a luma intra prediction mode is not transmitted via the bitstream. Instead, a texture gradient processing is performed to derive two best modes. An identical fashion is used at the encoder side and at the decoder side. The predictors of the two derived modes and Planar mode are computed normally, and the weighted average of the three predictors is used as a final predictor of the current block.

The DIMD mode is used as an alternative intra prediction mode and a flag is signaled for each block to indicate whether to use DIMD mode or not. If the flag is true (e.g., the flag is equal to 1), the DIMD mode is used for the current block, and the BDPCM flag, MIP (Matrix Weighted Intra Prediction) flag, ISP flag and MRL index are inferred to be 0. In this case, an entire intra prediction mode parsing is also skipped. If the flag is false (e.g., the flag is equal to 0), the DIMD mode is not used for the current block and the parsing of the other intra prediction modes continues normally.

To derive the two intra prediction modes and determine the weight of each mode, a histogram is built by performing the texture gradient processing.

Figure 7:
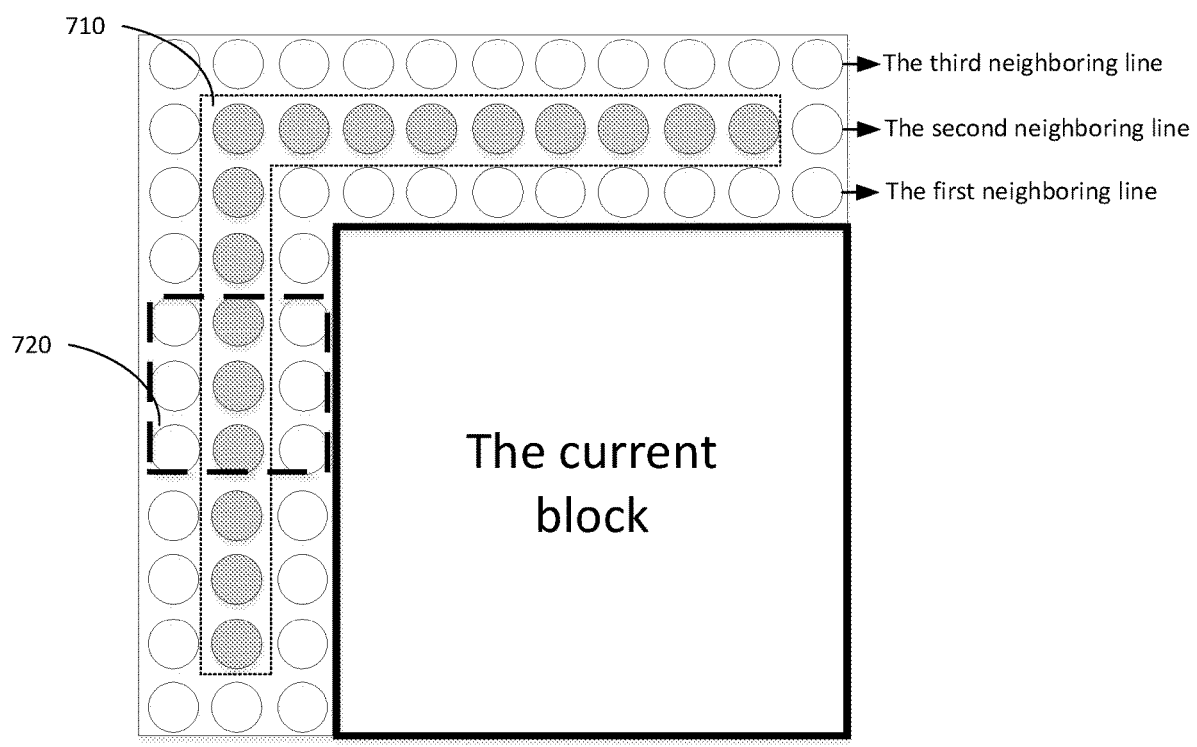
FIG. 7 illustrates exemplary pixels used for calculating gradients in decoder-side intra mode derivation (DIMD), according to some embodiments of the present disclosure.

FIG. 7 illustrates exemplary samples used for calculating gradients in DIMD, according to some embodiments of the present disclosure. As shown in FIG. 7, to build a DIMD histogram for a block, a gradient analysis is performed on the samples 710 of L-shaped template of the second neighboring line surrounding the block. For each available reconstructed sample of the template, a horizontal gradient and a vertical gradient, Gx and Gy, are carried out by applying horizontal and vertical Sobel filters as follows:

$$F_{hor} = \begin{bmatrix} 1 & 0 & -1 \\ 2 & 0 & -2 \\ 1 & 0 & -1 \end{bmatrix} \text{ and } F_{ver} = \begin{bmatrix} -1 & -2 & -1 \\ 0 & 0 & 0 \\ 1 & 2 & 1 \end{bmatrix}$$

The horizontal and vertical Sobel filters have a filter window 720, as shown in FIG. 7.

For each sample in the template, for which the horizontal gradient Gx and the vertical gradient Gy are calculated, the intensity (G) and the orientation (O) of the gradients are further calculated using Gx and Gy as follows:

$$G = |G_x| + |G_y| \text{ and } O = a\tan\left(\frac{G_y}{G_x}\right)$$

The orientation of the gradients O is converted into the closest intra angular prediction mode, and used to index a histogram which is first initialized to zero. The histogram value at that intra angular prediction mode is increased by G. Once all the samples in the template have been processed, the histogram will contain cumulative values of gradient intensities, for each intra angular prediction mode. The two modes with the largest and second largest amplitude values are selected and marked as $M_1$ and $M_2$, respectively, for following prediction fusion processes. If the maximum amplitude value in the histogram is 0, the Planar mode is selected as intra prediction mode for the current block.

In DIMD, the two intra prediction angular modes corresponding to two largest histogram amplitude values, $M_1$ and $M_2$, are combined with the Planar mode to generate the final prediction values of the current block.

Figure 8:
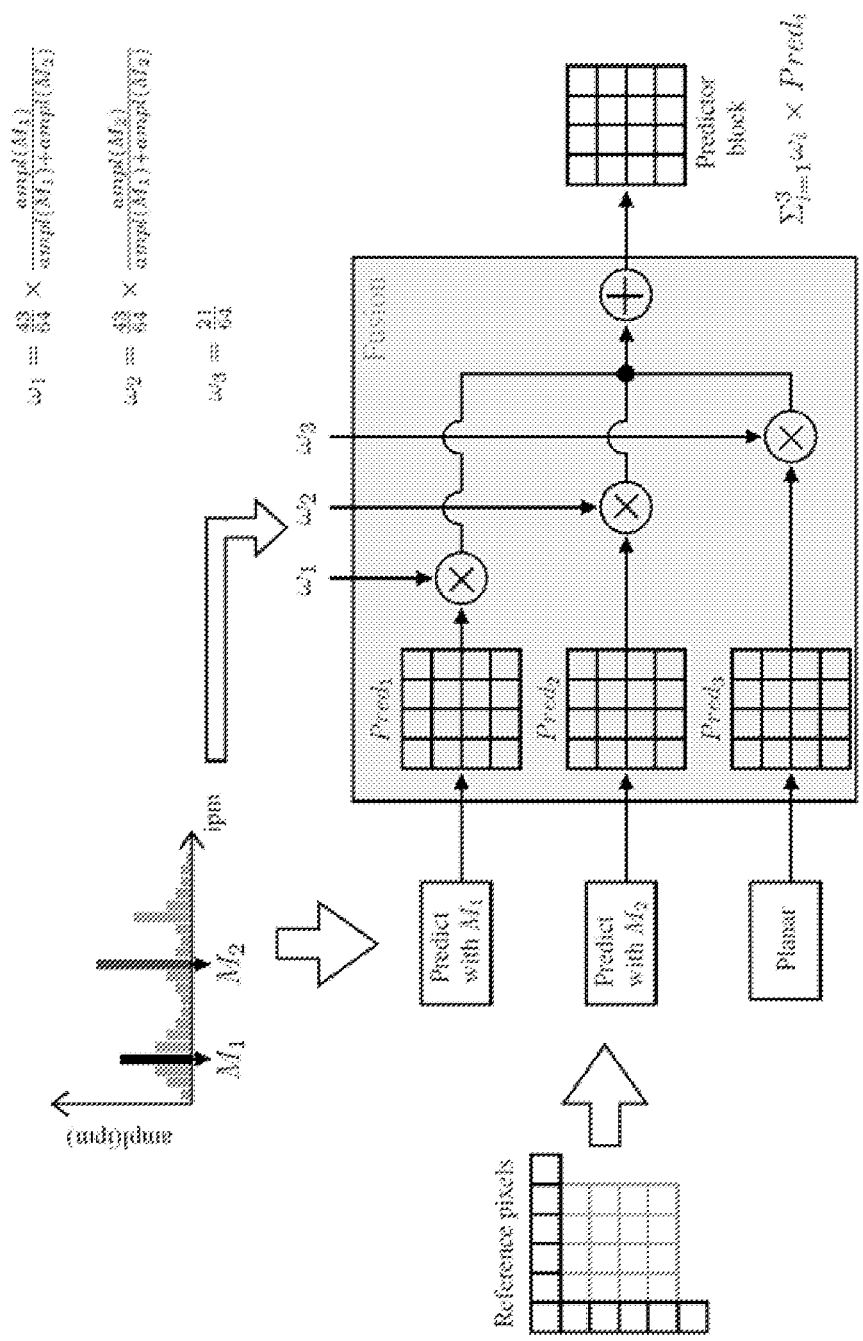
FIG. 8 illustrates a prediction blending process of DIMD, according to some embodiments of the present disclosure.

A prediction blending is applied as a weighted average of the above three predictors. The weight of Planar mode is fixed to 21/64 (approximately equal to 1/3). The remaining weight of 43/64 (approximately equal to 2/3) is shared between $M_1$ and $M_2$, proportionally to the amplitude values of $M_1$ and $M_2$. FIG. 8 illustrates a prediction blending process of DIMD, according to some embodiments of the present disclosure. As shown in FIG. 8, ampl($M_1$) and ampl($M_2$) represent the amplitude values of $M_1$ and $M_2$, respectively.

The DIMD mode is only used for luma block. If the current luma block selects the DIMD mode, the intra prediction mode of the current block is stored as $M_1$ for a selection of the low-frequency non-separable transform (LFNST) sets of the current block, a derivation of the most probable modes (MPM) list of the neighboring luma block, and a derivation of the direct mode (DM) of the co-located chroma block.

Figure 9:
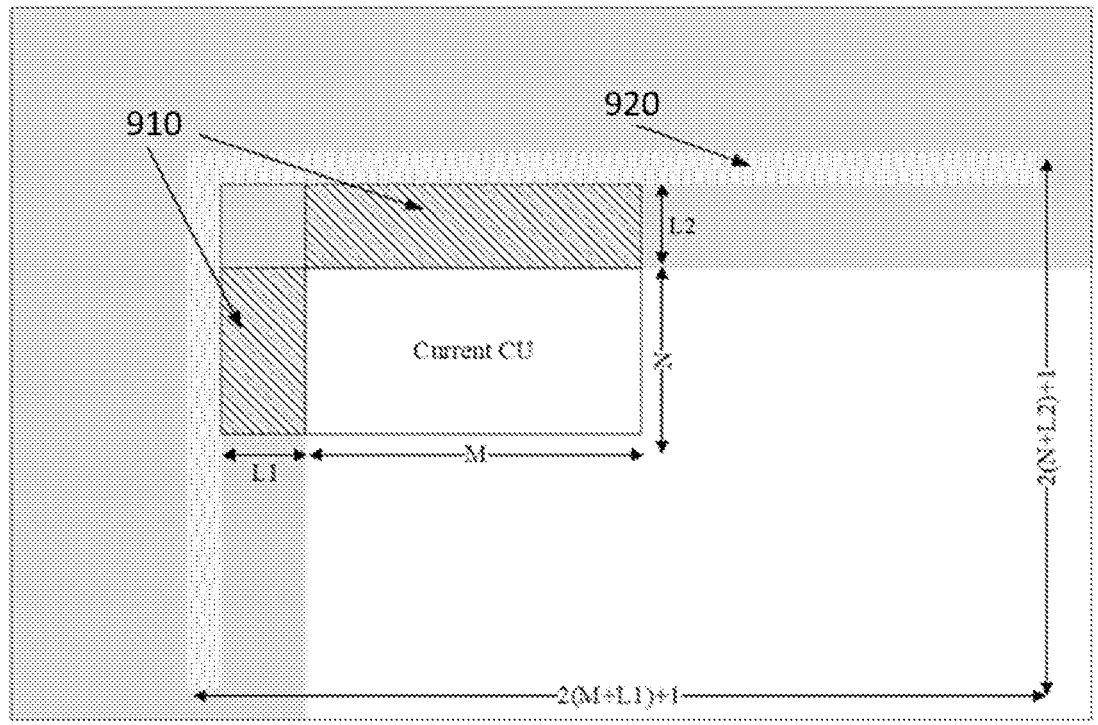
FIG. 9 illustrates an exemplary template and its reference samples used in template-based intra mode derivation (TIMD), according to some embodiments of the present disclosure.

Moreover, in some embodiments, another decoder-side intra prediction mode derivation method a template-based intra mode derivation (TIMD) using MPMs can be used. The intra prediction mode of a CU is derived with a template-based method at both encoder side and decoder side, instead of being signaled. A candidate is constructed from the MPM list, and the candidate modes can be 67 intra prediction modes as in VVC or extended to 131 intra prediction modes. FIG. 9 illustrates exemplary template and reference samples used in TIMD, according to some embodiments of the present disclosure. As shown in FIG. 9, the prediction samples of the template 910 are generated using the reference samples 920 of the template for each candidate mode. A value is calculated as a sum of absolute transformed differences (SATD) between the prediction and the reconstruction samples of the template. The intra prediction mode with a minimum value of the SATD is selected as the TIMD mode and used for intra prediction of the current CU.

The TIMD mode is used as an additional intra prediction method for a CU. A flag is signaled in sequence parameter set (SPS) to enable/disable the TIMD. When the flag is true (e.g., the flag is equal to 1), a CU level flag is signaled to indicate whether the TIMD is used. The TIMD flag is signaled after a MIP flag. If the TIMD flag is true (e.g., the TIMD flag is equal to 1), the remaining syntax elements related to luma intra prediction mode, including MRL, ISP, and normal parsing stage for luma intra prediction modes, are all skipped.

Since the number of intra prediction modes is extended to 131 in the TIMD, when storing the intra prediction mode for the current block, a table is used to map the 131 modes into the original 67 intra prediction modes in the VVC.

Consistent with the disclosed embodiments, a fusion of two intra prediction modes can be derived from the TIMD method, which is called a TIMD fusion method. Instead of selecting only one mode with the smallest SATD value, two modes are selected with the first two smallest SATD values using the TIMD method and then the predictors of the two selected modes are blended to generate a final predictor of the current block. The weights of the two modes are inversely proportional to the SATD values of the two modes.

During the construction of the MPM list, intra prediction mode of a neighboring block is derived as planar mode when the neighboring block is inter-coded. Consistent with the disclosed embodiments, to improve the accuracy of MPM list, when a neighbouring block is inter-coded, a propagated intra prediction mode is derived using a motion vector and reference picture of the neighboring block, and the propagated intra prediction mode is used in the construction of MPM list. Specifically, for an inter-coded block, a reference block can be determined according to its own motion vector and reference picture. If the reference block is intra-coded, the propagated intra prediction mode of the current block is set to the intra prediction mode of the reference block. If the reference block is inter-coded, the propagated intra prediction mode of the current block is set to the propagated intra prediction mode of the reference block. Then the propagated intra prediction mode of the current block can be used in the construction of MPM list of the neighboring blocks.

Figure 10:
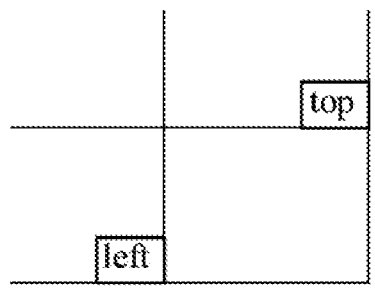
FIG. 10 illustrates a top neighboring block and a left neighboring block used in combined inter and intra prediction (CIIP) weight derivation, according to some embodiments of the present disclosure.

A combined inter and intra prediction (CIIP) is provided. In VVC, when a CU is coded in merge mode, if the CU contains at least 64 luma samples (that is, CU width times CU height is equal to or larger than 64), and if both CU width and CU height are less than 128 luma samples, an additional flag is signaled to indicate if the CIIP mode is applied to the current CU. The CIIP prediction combines an inter predictor with an intra predictor. An inter predictor in the CIIP mode $P_{inter}$ is derived using the same inter prediction process applied to regular merge mode, and an intra predictor $P_{intra}$ is derived following the regular intra prediction process with the Planar mode. FIG. 10 illustrates top and left neighboring blocks used in CIIP weight derivation, according to some embodiments of the present disclosure. The intra and inter predictors are combined using weighted averaging, where the weight value is calculated depending on the coding modes of the top and left neighboring blocks (as shown in FIG. 10).

The weights (wIntra, wInter) for intra predictor and inter predictor are adaptively set as follows. If both top and left neighbors are intra-coded, (wIntra, wInter) are set equal to (3, 1). If one of these blocks is intra-coded, the weights are identical, i.e., set equal to (2, 2). If neither of the top and left neighbors is intra-coded, the weights are set equal to (1, 3). The CIIP predictor is formed as follows:

$$P_{CIIP}=(\text{wInter}*P_{inter}+\text{wIntra}*P_{intra}+2)>>2$$

In some embodiments, a multi-hypothesis prediction for intra and inter modes can be used. In a merge CU, one flag is signaled for merge mode to select an intra prediction mode from an intra candidate list when the flag is true. For luma component, the intra candidate list is derived from 4 intra prediction modes including DC, planar, horizontal, and vertical modes. One intra prediction mode selected by the intra prediction mode index and one inter prediction mode selected by the merge index are combined using weighted average. The weights for combining predictions are described as follows. When DC or Planar mode is selected or the CU width or height is smaller than 4, equal weights are applied. For those CUs with CU width and height larger than or equal to 4, when a horizontal/vertical mode is selected, one CU is first vertically or horizontally split into four equal-size regions. Each weight set, denoted as (wIntrai, wInteri), where i is from 1 to 4 and (wIntra1, wInter1)=(6, 2), (wIntra2, wInter2)=(5, 3), (wIntra3, wInter3)=(3, 5), and (wIntra4, wInter4)=(2, 6), are applied to a corresponding region. (wIntra1, wInter1) is for the region closest to the reference samples and (wIntra4, wInter4) is for the region farthest away from the reference samples. The combined predictor can be calculated by summing up the two weighted predictors and right-shifting a number of bits, where the number of bits is obtained by logarithm of a sum of the two weights. In this example, the combined predictor is obtained by summing up the two weighted predictors and right-shifting 3 bits. In some embodiments, when the sum of two weights is equal to 1, the combined predictor can be obtained by summing up the two weighted predictor directly, since the logarithm of 1 is 0. There is no right-shifting needed. For example, each weight set can be (wIntra1, wInter1)=(⅝, ⅜), (wIntra2, wInter2)=(⅝, ⅜), (wIntra3, wInter3)=(⅜, ⅝), and (wIntra4, wInter4)=(⅜, ⅝), are applied to a corresponding region. (wIntra1, wInter1) is for the region closest to the reference samples and (wIntra4, wInter4) is for the region farthest away from the reference samples.

Figure 11:
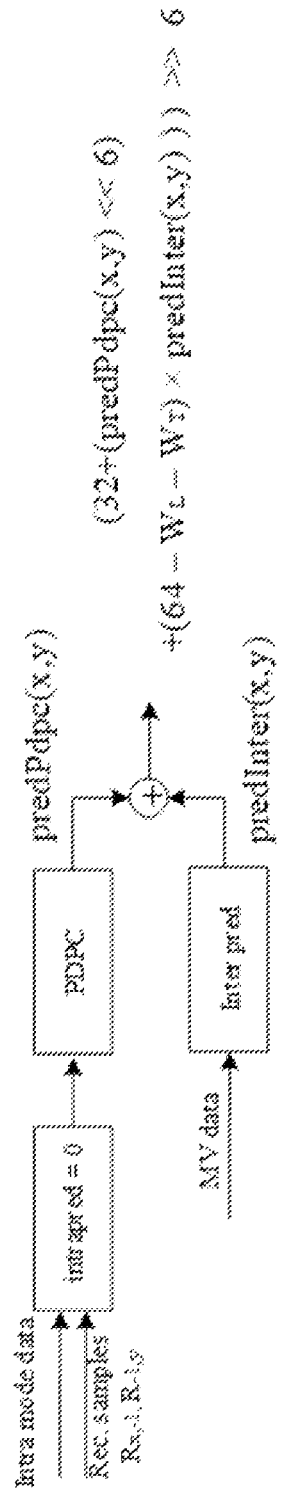
FIG. 11 illustrates an exemplary flowchart of the extended CIIP mode using position dependent intra prediction combination (PDPC), according to some embodiments of the present disclosure.

In some embodiments, a CIIP_PDPC mode can be used. In CIIP_PDPC, the prediction of the regular merge mode is refined using the above (Rx, −1) and left (−1, Ry) reconstructed samples. This refinement inherits the position dependent prediction combination (PDPC) scheme. FIG. 11 illustrates an exemplary flow chart of CIIP_PDPC, according to some embodiments of the present disclosure. Referring to FIG. 11, WT and WL are the weighted values which depend on the sample position in the block as defined in PDPC.

The CIIP_PDPC mode is signaled together with CIIP mode. When CIIP flag is true, another flag, namely CIIP_PDPC flag, is further signaled to indicate whether to use CIIP_PDPC or not.

In the current CIIP design, only the Planar mode is used to derive the intra prediction part. Even for the multi-hypothesis prediction for intra and inter mode methods, the intra prediction mode used for generating the intra prediction part can only be selected from up to four modes. Therefore, the intra predictors in CIIP are not accurate enough.

If the intra prediction part of CIIP is allowed to be chosen from more intra prediction modes, the accuracy may be improved. However, more bits are required to indicate which intra prediction mode is used. Considering that the DIMD and TIMD are two decoder side intra prediction mode derivation methods which can save the signaling of intra prediction mode, using the intra prediction mode derived by DIMD and/or TIMD to generate the intra predictor in CIIP may improve the coding performance.

In this disclosure, to improve the coding performance, some methods for generating the CIIP predictor are provided.

In some embodiments, methods for generating the intra predictor in CIIP are proposed.

Figure 12:
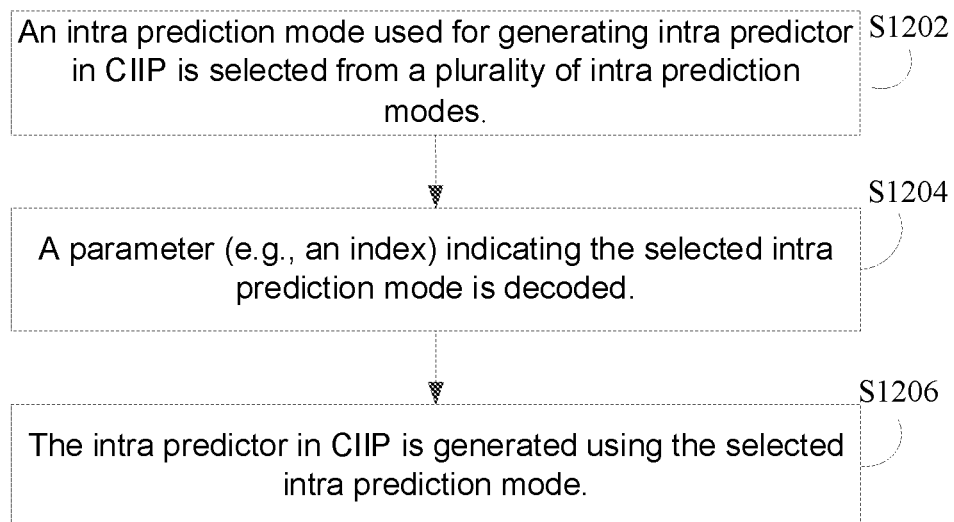
FIG. 12 illustrates an exemplary flowchart of a method for generating an intra predictor in CIIP, according to some embodiments of the present disclosure.

In a first embodiment, the regular intra prediction modes that can be used to generate the intra predictor in CIIP is extended to a maximum of 67 modes as shown in FIG. 5, which can be referred to as CIIP_regular mode. FIG. 12 illustrates an exemplary flowchart of a method 1200 for generating an intra predictor in CIIP, according to some embodiments of the present disclosure. Method 1200 can be performed by a decoder (e.g., by process 300A of FIG. 3A or 300B of FIG. 3B) or performed by one or more software or hardware components of an apparatus (e.g., apparatus 400 of FIG. 4). For example, a processor (e.g., processor 402 of FIG. 4) can perform method 1200. In some embodiments, method 1200 can be implemented by a computer program product, embodied in a computer-readable medium, including computer-executable instructions, such as program code, executed by computers (e.g., apparatus 400 of FIG. 4). Referring to FIG. 12, method 1200 may include the following steps S1202 and S1206.

At S1202, an intra prediction mode used for generating intra predictor in CIIP is selected from a plurality of intra prediction modes. In some embodiments, the intra prediction mode is selected from angular intra prediction modes shown in FIG. 5 and the two non-angular intra prediction modes, Planar mode and DC mode. Therefore, the number of the intra prediction modes used for generating intra predictor in CIIP can be up to 67. The intra predictor can be derived following the regular intra prediction process. In some embodiments, the intra predictor in CIIP can be generated with non-regular intra prediction modes, such as MIP mode, ISP mode, MRL mode, etc.

At S1204, a parameter (e.g., an index) indicating the selected intra prediction mode is decoded. For example, values of the index can correspond to different intra prediction modes respectively (e.g., 0 to 66). In some embodiments, the index can correspond to MIP mode, ISP mode, MRL mode, etc. The index can be coded in various methods, which is not limited herein.

At step S1206, the intra predictor in CIIP is generated using the selected intra prediction mode.

Instead of only using Planar mode, a plurality of intra prediction modes can be used for generating the intra predictor, such that the accuracy of CIIP is improved.

In a second embodiment, a combination of the DIMD and CIIP (e.g., CIIP_DIMD mode) is provided. Specifically, the DIMD information is used to generate the intra predictor in CIIP.

In some embodiments, the intra predicator in CIIP is generated using a blending prediction method of DIMD. In this example, predictors of the two intra prediction angular modes with the first two largest amplitude values in the DIMD histogram and the Planar mode are weighted average to generate the final intra predictor in CIIP.

In some embodiments, the DIMD texture gradient process is performed for the current block. The intra predictor in CIIP is generated using an intra prediction mode with the largest amplitude value in the DIMD histogram.

In some embodiments, according to the DIMD information, the intra predictor in CIIP is generated using an intra prediction mode selected from several fixed intra prediction modes. Specifically, the fixed intra prediction modes include Planar mode, horizontal mode and vertical mode. For example, if the intra prediction mode with the largest amplitude value in the DIMD histogram is close to the horizontal mode (e.g., when the absolute value of the difference between the derived mode index and the horizontal mode index is less than 10), the horizontal mode is used to generate the intra predictor in CIIP. If the mode is close to the vertical mode (e.g., when the absolute value of the difference between the derived mode index and the vertical mode index is less than 10), the vertical mode is used to generate the intra predictor in CIIP. Otherwise, the Planar mode is used to generate the intra predictor in CIIP.

Figure 13:
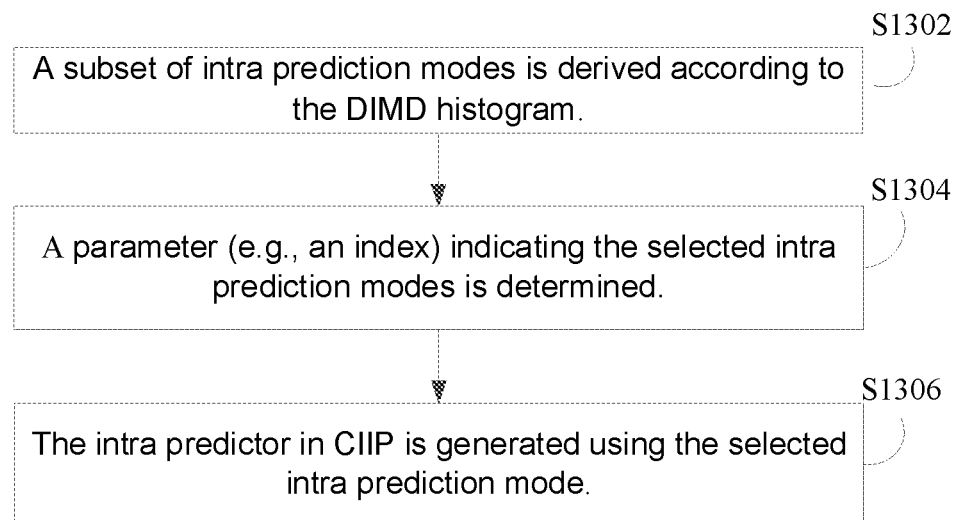
FIG. 13 illustrates another exemplary flowchart of a method for generating an intra predictor in CIIP, according to some embodiments of the present disclosure.

In some embodiments, the intra predictor in CIIP can be generated by selecting from a subset of intra prediction modes. FIG. 13 illustrates an exemplary flowchart of a method 1300 for generating an intra predictor in CIIP, according to some embodiments of the present disclosure. Method 1300 can be performed by a decoder (e.g., by process 300A of FIG. 3A or 300B of FIG. 3B) or performed by one or more software or hardware components of an apparatus (e.g., apparatus 400 of FIG. 4). For example, a processor (e.g., processor 402 of FIG. 4) can perform method 1300. In some embodiments, method 1300 can be implemented by a computer program product, embodied in a computer-readable medium, including computer-executable instructions, such as program code, executed by computers (e.g., apparatus 400 of FIG. 4). Referring to FIG. 13, method 1300 may include the following steps S1302-S1306.

At step S1302, a subset of intra prediction modes is derived according to the DIMD histogram. The subset of intra prediction modes contains N modes with first N largest amplitude values in the DIMD histogram, where N is a positive integer number.

At step S1304, a parameter (e.g., an index) indicating the selected intra prediction modes is determined.

At step S1306, the intra predictor in CIIP is generated using the selected intra prediction mode.

In some embodiments, if the intra prediction modes used for blending prediction and the weight of each intra prediction mode are different from the current DIMD design, the intra predictor in CIIP can be generated with one of the blending prediction methods, the intra prediction mode with the largest weight, and the non-Planar intra prediction mode with the largest weight.

In a third embodiment, a combination of the TIMD and CIIP (e.g., CIIP_TIMD mode) is provided. Specifically, the TIMD information is used to generate the intra predictor in CIIP. For example, when a CIIP mode is determined to be enabled for a target block, the intra predictor in CIIP is generated with an intra prediction mode which is determined using the TMID method.

In some embodiments, the intra predictor in CIIP can be generated using the extended intra prediction mode derived by the TIMD method. In the current TIMD design, the index of the derived extended intra prediction mode is in the range from 0 to 130. Therefore, the number of the extended intra prediction mode used for generating the intra predictor in CIIP can be up to 131.

In some embodiments, the extended intra prediction mode with index ranging from 0 to 130, which is derived by the TIMD method, can be mapped to a regular intra prediction mode in VVC with an index ranging from 0 to 66, and then the intra predictor in CIIP is generated using the mapped regular intra prediction mode.

In some embodiments, according to the intra prediction mode derived by TIMD, one of several fixed intra prediction modes is selected for generating the intra predictor in CIIP. For example, the fixed intra prediction modes can include Planar, horizontal mode and vertical mode. If the derived mode is close to the horizontal mode (e.g., when the absolute value of the difference between the derived mode index and the horizontal mode index is less than 10), the horizontal mode is used to generate the intra predictor in CIIP. If the derived mode is close to the vertical mode (e.g., when the absolute value of the difference between the derived mode index and the vertical mode index is less than 10), the vertical mode is used to generate the intra predictor in CIIP. Otherwise, the Planar mode is used to generate the intra predictor in CIIP.

In some embodiments, a subset of intra prediction modes is derived according to a cost (e.g., SATD) calculated using the TIMD method, wherein the subset of intra prediction modes contains N modes with small costs. A parameter (e.g., an index) is signaled to select one mode from the subset of intra prediction modes, and the intra predictor in CIIP is generated using the selected mode.

As described above, a list of intra prediction modes is constructed using the TIMD method, and one intra prediction is selected by the template-based derivation method from the list. In some embodiments, when the TIMD method is used to derive the intra prediction mode in CIIP, the intra prediction mode list used may be different from the regular TIMD.

In some embodiments, the intra predictor in CIIP is generated using an intra prediction mode derived by a subset of the regular TIMD intra prediction mode list.

In some embodiments, the subset of the regular TIMD intra prediction mode list is a fixed TIMD intra prediction mode list, for example, a fixed TIMD intra prediction mode list including Planar mode, DC mode, horizontal mode, and vertical mode. The intra predictor in CIIP is generated using an intra prediction mode derived by the fixed TIMD intra prediction mode list.

Figure 14:
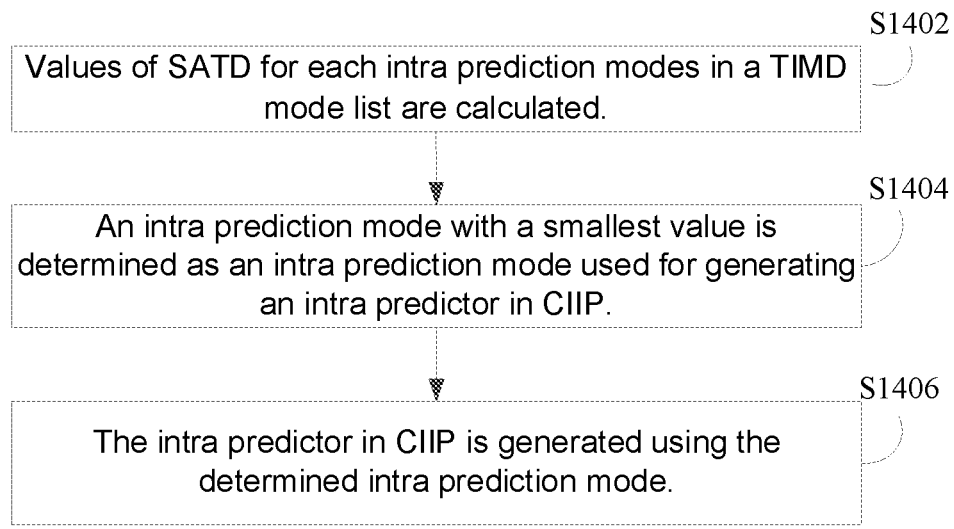
FIG. 14 illustrates another exemplary flowchart of a method for generating an intra predictor in CIIP, according to some embodiments of the present disclosure.

In some embodiments, the final intra predictor in CIIP is generated using the intra prediction mode with the smallest SATD value in the TIMD intra prediction mode list. FIG. 14 illustrates an exemplary flowchart of a method 1400 for generating an intra predictor in CIIP, according to some embodiments of the present disclosure. Method 1400 can be performed by a decoder (e.g., by process 300A of FIG. 3A or 300B of FIG. 3B) or performed by one or more software or hardware components of an apparatus (e.g., apparatus 400 of FIG. 4). For example, a processor (e.g., processor 402 of FIG. 4) can perform method 1400. In some embodiments, method 1400 can be implemented by a computer program product, embodied in a computer-readable medium, including computer-executable instructions, such as program code, executed by computers (e.g., apparatus 400 of FIG. 4). Referring to FIG. 14, method 1400 may include the following steps S1402-S1406.

At step S1402, values of SATD for each intra prediction modes in a TIMD mode list are calculated.

At step S1404, an intra prediction mode with a smallest value is determined as an intra prediction mode used for generating an intra predictor in CIIP.

At step S1406, the intra predictor in CIIP is generated using the determined intra prediction mode.

In some embodiments, the intra prediction mode with the smallest SATD value in the TIMD intra prediction mode list is further mapped to a regular intra prediction mode in VVC (e.g., with index of 0 to 67), and then the final intra predictor in CIIP is generated using the mapped regular intra prediction mode.

In a fourth embodiment, a combination of the TIMD fusion and CIIP method (e.g., CIIP_TIMDfusion mode) is provided. Specifically, the intra predictor in CIIP is generated using the information of the TIMD fusion method. In some embodiments, the final intra predictor in CIIP is generated by weighted averaging the predictors of the two intra prediction modes with the first two smallest SATD values in the TIMD intra prediction mode list.

Figure 15:
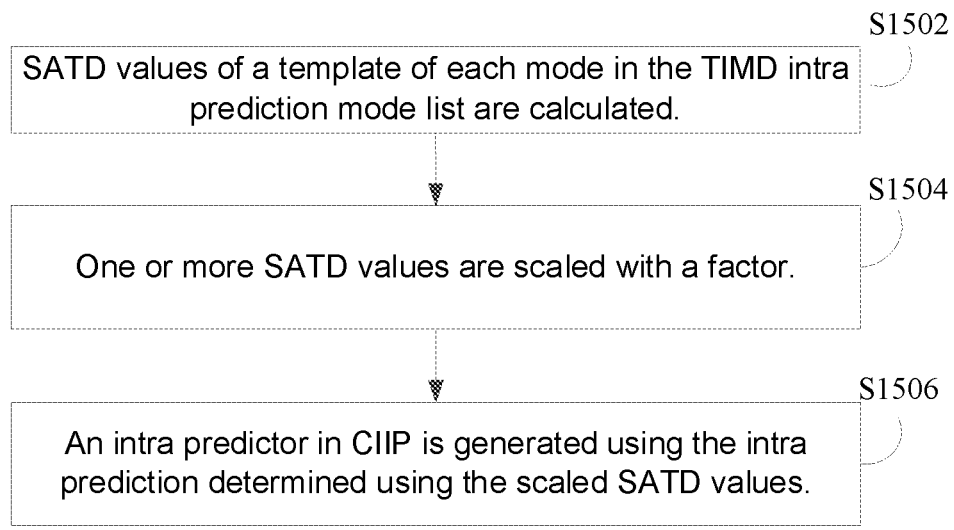
FIG. 15 illustrates another exemplary flowchart of a method for generating an intra predictor in CIIP, according to some embodiments of the present disclosure.

In a fifth embodiment, it is proposed to modify the derivation method of the TIMD method or TIMD fusion method by scaling the SATD values of some intra prediction modes in the TIMD intra prediction mode list with a factor and then the scaled SATD values are used to derive the intra prediction mode used for the current block. FIG. 15 illustrates an exemplary flowchart of a method 1500 for generating an intra predictor in CIIP, according to some embodiments of the present disclosure. Method 1500 can be performed by a decoder (e.g., by process 300A of FIG. 3A or 300B of FIG. 3B) or performed by one or more software or hardware components of an apparatus (e.g., apparatus 400 of FIG. 4). For example, a processor (e.g., processor 402 of FIG. 4) can perform method 1500. In some embodiments, method 1500 can be implemented by a computer program product, embodied in a computer-readable medium, including computer-executable instructions, such as program code, executed by computers (e.g., apparatus 400 of FIG. 4). Referring to FIG. 15, method 1500 may include the following steps S1502-S1506.

At step S1502, SATD values of a template of each mode in the TIMD intra prediction mode list are calculated.

At step S1504, one or more SATD values are scaled with a factor. In some embodiments, the SATD value of the planar mode is multiplied by a factor. The factor can be any positive value greater than 0 and less than 1. For example, the factor can be equal to 0.9.

In some embodiments, the SATD value of the planar mode is multiplied by a factor based on the block size of the current block, which means different factors can be used for blocks with different sizes. For example, for blocks with a size greater than 1024, the factor is equal to 0.8; and for blocks with a size less than or equal to 1024, the factor is equal to 0.9.

In some embodiments, the SATD values of the intra prediction modes in a subset of the TIMD intra prediction mode list are multiplied by a factor. The factor can be any positive value that is greater than 0 and less than 1. For example, the subset can be a list including planar mode, and DC mode, or a list including planar mode, DC mode, horizontal mode, and vertical mode. In this example, the factors for different intra prediction modes can be different. For the same intra prediction mode, the factors for different block sizes can also be different.

At step S1506, an intra predictor in CIIP is generated using the intra prediction determined using the scaled SATD values.

Figure 16:
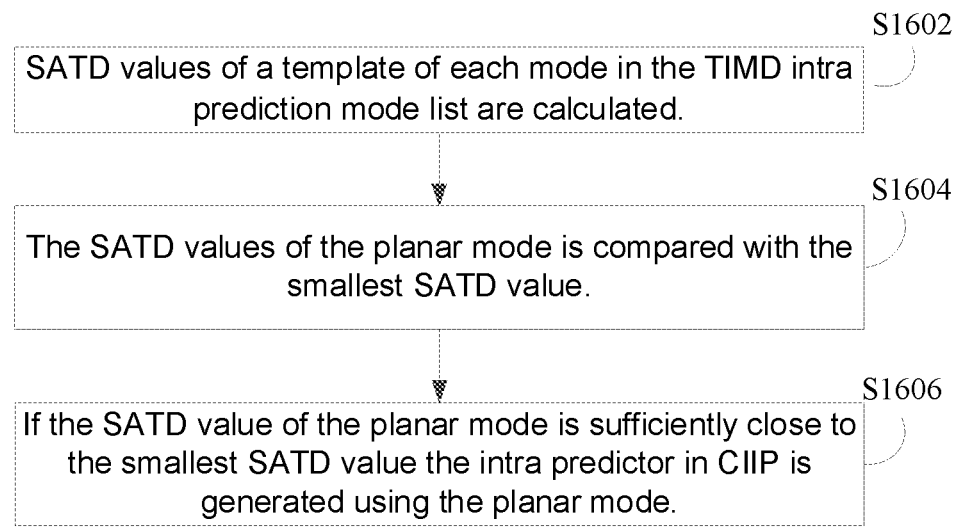
FIG. 16 illustrates another exemplary flowchart of a method for generating an intra predictor in CIIP, according to some embodiments of the present disclosure.

In a sixth embodiment, the derivation method of the TIMD method or TIMD fusion method can be modified based on the SATD value of the planar mode. FIG. 16 illustrates an exemplary flowchart of a method 1600 for generating an intra predictor in CIIP, according to some embodiments of the present disclosure. Method 1600 can be performed by a decoder (e.g., by process 300A of FIG. 3A or 300B of FIG. 3B) or performed by one or more software or hardware components of an apparatus (e.g., apparatus 400 of FIG. 4). For example, a processor (e.g., processor 402 of FIG. 4) can perform method 1600. In some embodiments, method 1600 can be implemented by a computer program product, embodied in a computer-readable medium, including computer-executable instructions, such as program code, executed by computers (e.g., apparatus 400 of FIG. 4). Referring to FIG. 16, method 1600 may include the following steps S1602-S1606.

At step 1602, SATD values of a template of each mode in the TIMD intra prediction mode list are calculated.

At step 1604, the SATD values of the planar mode is compared with the smallest SATD value.

At step 1606, if the SATD value of the planar mode is sufficiently close to the smallest SATD value (e.g., the SATD value of the planar mode is not greater than 1.2 times of the smallest SATD value), the intra predictor in CIIP is generated using the planar mode.

In some embodiments, the methods 1500 and 1600 are only used for CIIP mode coded block that using the TIMD or TIMD fusion information.

In a seventh embodiment, a combination of the DIMD, TIMD and CIIP methods is provided. Specifically, the information of DIMD and TIMD is used together to generate the intra predictor in CIIP.

In some embodiments, the intra predictor generated by the DIMD information as described in the second embodiment where methods of combination of the DIMD and CIIP are provided, and the intra predictor generated by the TIMD information as described in the third embodiment where methods of combination of the TIMD and CIIP are provided, are blended to generate the final intra predictor in CIIP.

In some embodiments, N modes with the N largest amplitude values in the DIMD histogram, Planar mode, and DC mode are used as an input list for the TIMD method to derive the intra prediction mode used to generate the intra predictor in CIIP. The value of N can be any positive integer value ranging from 2 to 65.

In some embodiments, only when the TIMD derived mode is one of the N modes with the N largest amplitude values in the DIMD histogram, the Planar mode and the DC mode, the TIMD derived mode is used to generate the intra predictor in the CIIP. Otherwise, the Planar mode is used to generate the intra predictor in the CIIP.

For the convenience of description, the CIIP mode proposed in the aforementioned embodiments with the modified intra predictor generation method is called CIIP_NEW mode in this disclosure. It can be understood that the CIIP_NEW mode includes any variants of CIIP_regular mode, CIIP_DIMD mode, CIIP_TIMD mode, CIIP_TIMDfusion mode, etc.

In some embodiments, the weights of inter predictor and intra predictor in CIIP can be modified.

In an eighth embodiment, it is proposed that the weights of inter predictor and intra predictor, (wIntra, wInter), in the proposed CIIP_NEW mode, can be the same as or different from the current CIIP design.

In some embodiments, the weights of inter predictor and intra predictor in the proposed CIIP_NEW mode is the same as the current CIIP design. For example, if both top and left neighbors are intra-coded, (wIntra, wInter) is set equal to (3, 1). If one of these blocks is intra-coded, these weights are identical, i.e., (2, 2), otherwise, the weights are set equal to (1, 3).

In some embodiments, the weights of inter predictor and intra predictor in the proposed CIIP_NEW mode depend on the intra prediction mode used to generate the intra predictor.

For example, if the intra prediction mode is close to the horizontal mode or vertical mode (e.g., the absolute value of the difference between the intra prediction mode index and the horizontal or vertical mode index is less than a threshold) and the width or height is not less than 4, the weights of the multi-hypothesis prediction for intra and inter mode method is used as described above. For example, when the intra prediction mode is one of the 67 modes of VVC, the threshold can range from 0 to 34. The threshold can be any valid positive integer.

Figures 17A, 17B:
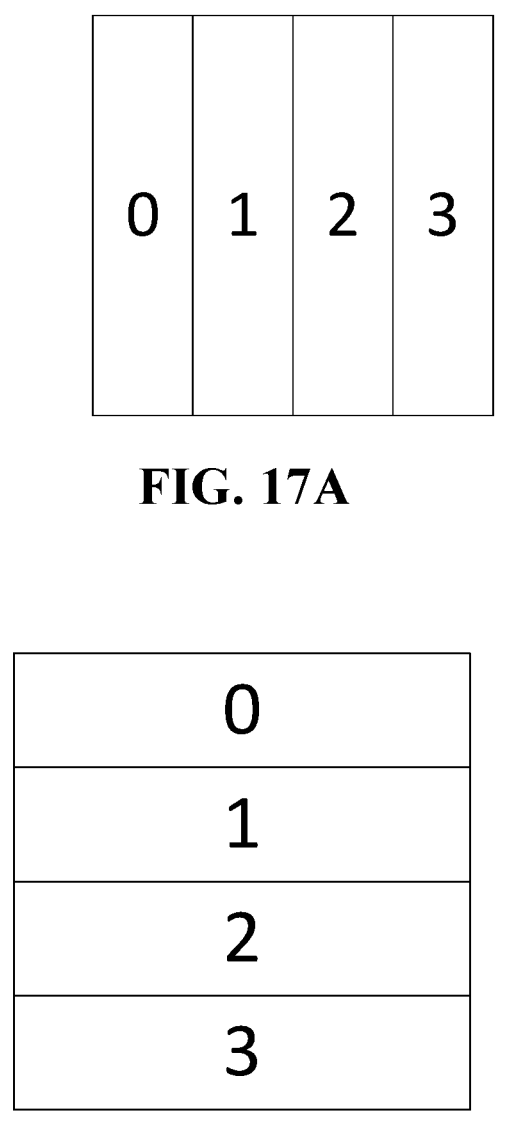

FIGS. 17A and 17B illustrate exemplary methods for splitting a coding block in vertical and horizontal respectively, according to some embodiments of the present disclosure. As shown in FIG. 17A, for near-horizontal modes (e.g., intra prediction mode index (i.e., angular mode index) is equal to or greater than 2 and less than 34), the current block is first vertically split into four equal-size sub-blocks, with a sub-block index from 0 to 3 from left to right. As shown in FIG. 17B, for near-vertical modes (e.g., intra prediction mode index is greater than 34 and less than or equal to 66), the current block is first horizontally split into four equal-size sub-blocks, with a sub-block index from 0 to 3 from top to bottom. In some embodiments, when the intra prediction modes are extended, near-horizontal modes refer to modes of which the angular mode index is equal to or greater than an angular mode index of the diagonal mode from bottom left to top right and less than an angular mode index of the diagonal mode from top left to bottom right. Near-vertical modes refer to modes of which the angular mode index is equal to or greater than the angular mode index of the diagonal mode from top left to bottom right and equal to or less than an angular mode index of the diagonal mode from top right to bottom left.

Different weights (wIntra, wInter) are used for different sub-blocks. For example, the four sets of weights (wIntra1, wInter1)=(6, 2), (wIntra2, wInter2)=(5, 3), (wIntra3, wInter3)=(3, 5), and (wIntra4, wInter4)=(2, 6) are used for the four sub-blocks, respectively, as shown in Table 1:

TABLE 1

| Exemplary weights used for angular modes. | |
|---|---|
| The sub-block index | (wIntra, wInter) |
| 0 | (6, 2) |
| 1 | (5, 3) |
| 2 | (3, 5) |
| 3 | (2, 6) |

Otherwise, for example, the intra prediction mode index being 0 or 1, the same weights as the current CIIP design are used. That is, if both top and left neighbors are intra-coded, (wIntra, wInter) are set equal to (3, 1). If one of these blocks is intra-coded, these weights are identical, i.e., (2, 2). If neither of the top and left neighbors is intra-coded, the weights are set equal to (1, 3).

Figure 18:
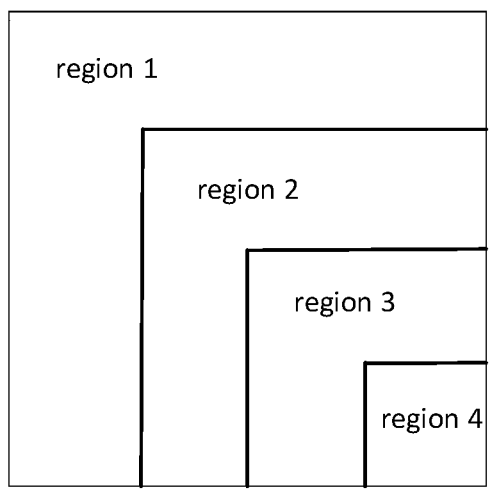
FIG. 18 illustrates an exemplary method for splitting a coding block in an angular intra prediction mode, according to some embodiments of the present disclosure.

FIG. 18 illustrates another exemplary method for splitting a coding block in an angular intra prediction mode, according to some embodiments of the present disclosure. Referring to FIG. 18, if an angular intra prediction mode is close to diagonal mode (e.g., the absolute value of the difference between the angular intra prediction mode index and the diagonal index (i.e., 34 in VVC) is less than a threshold), the current block is split into four regions, and different weights (wIntra, wInter) are used for different regions. For example, the four sets of weights (wIntra1, wInter1)=(6, 2), (wIntra2, wInter2)=(5, 3), (wIntra3, wInter3)=(3, 5), and (wIntra4, wInter4)=(2, 6) are used for the four regions, respectively.

In some embodiments, the weights derivation method based on the coded modes of the neighboring blocks and the weights derivation method based on the sub regions are combined. For example, if both top and left neighbors are intra-coded, the four sets of weights (wIntra1, wInter1)=(7, 1), (wIntra2, wInter2)=(6, 2), (wIntra3, wInter3)=(4, 4), and (wIntra4, wInter4)=(3, 5) are used for the four regions. If only one of these blocks is intra-coded, the four sets of weights (wIntra1, wInter1)=(6, 2), (wIntra2, wInter2)=(5, 3), (wIntra3, wInter3)=(3, 5), and (wIntra4, wInter4)=(2, 6) are used for the four regions. If neither of the top and left neighbors is intra-coded, the four sets of weights (wIntra1, wInter1)=(5, 3), (wIntra2, wInter2)=(4, 4), (wIntra3, wInter3)=(2, 6), and (wIntra4, wInter4)=(1, 7) are used for the four regions.

In some embodiments, the intra prediction mode used to generate the intra predictor in CIIP is first converted to wide angular mode to derive the weights (wIntra, wInter) by the aforementioned methods in the eighth embodiment.

In some embodiments, the intra predictor is generated by blending some intra prediction modes. It is proposed to use the Planar mode or the intra prediction mode with the largest weight or the non-Planar intra prediction mode with the largest weight to derive the (wIntra, wInter) by the aforementioned methods in the eighth embodiment.

In some embodiments, methods for signaling the CIIP_NEW mode are provided.

In a ninth embodiment, the original CIIP mode that blends the Planar mode and regular merge mode is replaced with the proposed CIIP_NEW mode which modifies the method for generating the intra predictor.

In a tenth embodiment, it is adaptively determined whether to replace the original CIIP mode (e.g., an intra predictor generated with Planar mode only) with the proposed CIIP_NEW mode (e.g., CIIP_regular mode, CIIP_DIMD mode, CIIP_TIMD mode, CIIP_TIMDfusion mode, etc.).

Figure 19:
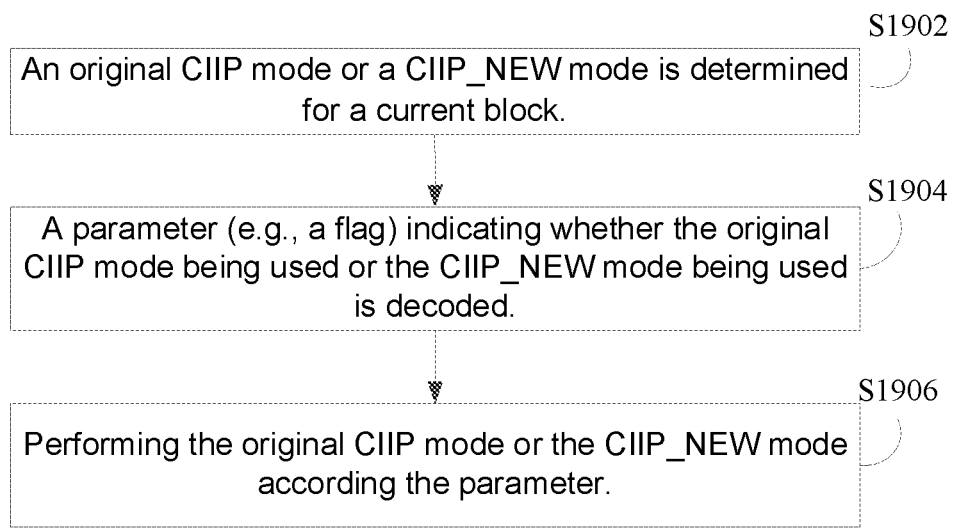
FIG. 19 illustrates an exemplary flowchart of a method for determining prediction mode, according to some embodiments of the present disclosure.

FIG. 19 illustrates an exemplary flowchart of method 1900 for determining prediction mode, according to some embodiments of the present disclosure. Method 1900 can be performed by a decoder (e.g., by process 300A of FIG. 3A or 300B of FIG. 3B) or performed by one or more software or hardware components of an apparatus (e.g., apparatus 400 of FIG. 4). For example, a processor (e.g., processor 402 of FIG. 4) can perform method 1900. In some embodiments, method 1900 can be implemented by a computer program product, embodied in a computer-readable medium, including computer-executable instructions, such as program code, executed by computers (e.g., apparatus 400 of FIG. 4). Referring to FIG. 19, method 1900 may include the following steps S1902-S1906.

At step S1902, an original CIIP mode or a CIIP_NEW mode is determined for a current block. In some embodiments, the determination is based on the size of the current block. For example, for blocks with a size greater than a threshold, the original CIIP mode is used, and for blocks with a size less than or equal to the threshold, the proposed CIIP_NEW mode is used. For example, the threshold can be equal to 1024.

In some embodiments, the determination is based on the width and height of the current block. For example, for blocks with a width or height greater than a threshold, the original CIIP mode is used; otherwise, the proposed CIIP_NEW mode is used. For example, for blocks with a ratio of the long side and the short side greater than a threshold, the original CIIP mode is used, otherwise, the proposed CIIP_NEW mode is used.

In some embodiments, the determination is based on a relationship between the intra prediction mode with the largest amplitude value in the DIMD method and the intra prediction mode with the smallest SATD value in the TIMD method. For example, if the two intra prediction modes are similar (e.g., the absolute value of difference of the indexes of the two modes is smaller than 4), the proposed CIIP_NEW mode is used; otherwise, the original CIIP mode is used.

At step S1904, a parameter (e.g., a flag) indicating whether the original CIIP mode being used or the CIIP_NEW mode being used is decoded.

At step S1906, performing the original CIIP mode or the CIIP_NEW mode according to the parameter. In some embodiments, a further determination can be executed to determine which one of the CIIP_NEW modes is used based on the current block, for example, a size of the current block.

In an eleventh embodiment, the proposed CIIP_NEW mode can be used as a new CIIP mode, and an explicit signaling method is used to determine which CIIP mode to use.

For example, when only one CIIP_NEW mode is added, a CIIP index from 0 to 2 is signaled to determine which CIIP mode to use as shown in Table 2.

TABLE 2

| The determination of the 3 CIIP modes | |
|---|---|
| The CIIP index | The CIIP mode |
| 0 | The original CIIP mode |
| 1 | The CIIP_NEW mode |
| 2 | The CIIP_PDPC mode |

For example, when two CIIP_NEW modes are added, a CIIP index from 0 to 3 is signaled to determine which CIIP mode to use as shown in Table 3, wherein the CIIP_DIMD mode means the combination of CIIP and DIMD as described in the second embodiment and the CIIP_TIMD mode means the combination of CIIP and TIMD as described in the third embodiment.

TABLE 3

| The determination of the 4 CIIP modes | |
|---|---|
| The CIIP index | The CIIP mode |
| 0 | The original CIIP mode |
| 1 | The CIIP_DIMD mode |
| 2 | The CIIP_TIMD mode |
| 3 | The CIIP_PDPC mode |

In some embodiments, the disclosed CIIP mode can be used for coding the chroma samples.

In the current CIIP design, for a CIIP coded chroma block, the DM mode (the intra prediction mode of the co-located luma block) is used to derive the intra predictor. In the present disclosure, it is proposed that, for a chroma block, if the co-located luma block is coded by the proposed CIIP_NEW mode, the same intra prediction mode derivation method is used for the current chroma block to generate the intra predictor. In some embodiments, the Planar mode is always used for the CIIP_NEW mode coded chroma block to generate the intra predictor.

In some embodiments, for a block coded by the disclosed CIIP_NEW mode, the prediction mode of the block can be stored as inter prediction mode or Planar mode or the intra prediction mode used to generate the intra predictor.

In some embodiments, a propagated intra prediction mode for CIIP is proposed.

In some embodiments, it is proposed to modify the propagated intra prediction mode of the block that is coded by the original CIIP mode or the proposed CIIP_NEW mode.

In some embodiments, for a block that is coded by the original CIIP mode or the proposed CIIP_NEW mode, the propagated intra prediction mode is set to planar mode, and used in the construction of MPM list. For other inter-coded blocks, the propagated intra prediction mode is derived using the motion vector and reference picture.

In some embodiments, for a block that is coded by the original CIIP mode or the proposed CIIP_NEW mode, the propagated intra prediction mode is set to the intra prediction mode used to generate the intra predictor in CIIP, and used in the construction of MPM list. For other inter-coded blocks, the propagated intra prediction mode is derived using the motion vector and reference picture.

In some embodiments, it is proposed to modify the propagated intra prediction mode of the block coded by the CIIP_PDPC mode. For a block coded by the CIIP_PDPC mode, the propagated intra prediction mode is set to planar mode and used in the construction of MPM list. For other inter-coded blocks, the propagated intra prediction mode is derived using the motion vector and reference picture.

In some embodiments, the aforementioned two methods for determining the propagated intra prediction mode, regarding a block coded by the original CIIP mode or the proposed CIIP_NEW mode and by the CIIP_PDPC mode, can be combined. For example, for a block that is coded by the original CIIP mode or the proposed CIIP_NEW mode, the propagated intra prediction mode is set to the intra prediction mode used to generate the intra predictor in CIIP. For a block that is coded by the CIIP_PDPC mode, the propagated intra prediction mode is set to planar mode; and for other inter-coded blocks, the propagated intra prediction mode is derived using the motion vector and reference picture.

The aforementioned embodiments can be combined in any combinations.

The embodiments may further be described using the following clauses:

1. A method for performing combined inter and intra prediction (CIIP), comprising:
   determining the CIIP being enabled for a target block;
   determining a first intra prediction mode of the target block using a template-based intra mode derivation (TIMD) method;
   generating an intra predictor of the target block with the first intra prediction mode; and
   obtaining a final predictor of the target block by weighted averaging the intra predictor of the target block and the inter predictor of the target block.

2. The method according to clause 1, wherein determining the first intra prediction mode of the target block using the TIMD method further comprises:
   calculating values of sum of absolute transformed differences (SATD) of the target block associated respectively with a plurality of intra prediction modes in a TIMD mode list; and
   determining, among the plurality of intra prediction modes, an intra prediction mode with a smallest SATD value as the first intra prediction mode of the target block.

3. The method according to clause 1, wherein determining the first intra prediction mode of the target block using the TIMD method further comprises:
   calculating values of SATD of the target block associated respectively with a plurality of intra prediction modes in a TIMD mode list;
   determining, among the plurality of intra prediction modes, an intra prediction mode with a smallest SATD value, and mapping the intra prediction mode with the smallest SATD value to a regular intra prediction mode; and
   determining the regular intra prediction mode as the first intra prediction mode of the target block.

4. The method according to clause 1, wherein obtaining the final predictor of the target by weighted averaging the intra predictor of the target block and inter predictor of the target block further comprises:
   in response to the first intra prediction mode being an angular mode, determining an intra weight and an inter weight based on the first intra prediction mode; and
   obtaining the final predictor of the target block by weighted averaging the intra predictor of the target block and inter predictor of the target block with the intra weight and inter weight, respectively.

5. The method according to clause 4, wherein determining the intra weight and inter weight based on the first intra prediction mode further comprises:
   dividing the target block into a plurality of sub-blocks, wherein the target block is divided vertically when an angular mode index of the first intra prediction mode is less than a preset value, or the target block is divided horizontally when the angular mode index of the first intra prediction mode is equal to or greater than the preset value; and
   determining a sub-intra weight and a sub-inter weight for each of the plurality of sub-blocks; and
   wherein obtaining the final predictor of the target block by weighted averaging the intra predictor of the target block and inter predictor of the target block further comprises:
   determining a plurality of sub-final predictors associated with the plurality of sub-blocks, respectively, wherein each of the plurality of sub-final predictors is determined by weighted averaging the intra predictor and inter predictor with the sub-intra weight and sub-inter weight for the respective sub-block;
   determining a sum of the plurality of sub-final predictors; and
   obtaining the final predictor by right-shifting a number of bits, wherein the number of bits is obtained by logarithm of a sum of the sub-intra weight and the sub-inter weight.

6. The method according to clause 5, wherein:
   the target block is divided vertically into four equally sized sub-blocks when the angular mode index of the first intra prediction mode is equal to or greater than an angular mode index of the diagonal mode from bottom left to top right and less than an angular mode index of the diagonal mode from top left to bottom right, or the target block is divided horizontally into four equally sized sub-blocks when the angular mode index of the first intra prediction mode is equal to or greater than the angular mode index of the diagonal mode from top left to bottom right and equal to or less than an angular mode index of the diagonal mode from top right to bottom left;

the four equally sized sub-blocks include a first sub-block, a second sub-block, a third sub-block and a fourth sub-block, the first, second, third, and fourth sub-blocks being arranged respectively: from left to right when the target block is divided vertically, or from top to bottom when the target block is divided horizontally; and the sub-intra weight and sub-inter weight for the first sub-block are 6 and 2, respectively;

the sub-intra weight and sub-inter weight for the second sub-block are 5 and 3, respectively;

the sub-intra weight and sub-inter weight for the third sub-block are 3 and 5, respectively; and the sub-intra weight and sub-inter weight for the fourth sub-block are 2 and 6, respectively.

7. The method according to any one of clauses 1 to 6, wherein determining the first intra prediction mode of the target block using the TIMD method further comprises:

when the target block has a size less than or equal to a threshold, determining the first intra prediction mode of the target block using the TIMD method; and when the target block has a size greater than a threshold, determining the first intra prediction mode of the target block as the Planar mode.

8. The method according to clause 7, wherein the threshold is equal to 1024.

9. The method according to any one of clauses 1 to 8, further comprising:

setting a planar mode as a propagated intra prediction mode; and constructing a most probable mode (MPM) list for a neighboring block of the target block with the propagated intra prediction mode.

10. An apparatus for performing combined inter and intra prediction (CIIP), the apparatus comprising:

a memory figured to store instructions; and one or more processors configured to execute the instructions to cause the apparatus to perform:

determining the CIIP being enabled for a target block;

determining a first intra prediction mode of the target block using a template-based intra mode derivation (TIMD) method;

generating an intra predictor of the target block with the first intra prediction mode; and obtaining a final predictor of the target block by weighted averaging the intra predictor of the target block and the inter predictor of the target block.

11. The apparatus according to clause 10, wherein in determining the first intra prediction mode of the target block using the TIMD method, the one or more processors are further configured to execute the instructions to cause the apparatus to perform:

calculating values of sum of absolute transformed differences (SATD) of the target block associated respectively with a plurality of intra prediction modes in a TIMD mode list; and determining, among the plurality of intra prediction modes, an intra prediction mode with a smallest SATD value as the first intra prediction mode of the target block.

12. The apparatus according to clause 10, wherein in determining the first intra prediction mode of the target block using the TIMD method, the one or more processors are further configured to execute the instructions to cause the apparatus to perform:

calculating values of SATD of the target block associated respectively with a plurality of intra prediction modes in a TIMD mode list;

determining, among the plurality of intra prediction modes, an intra prediction mode with a smallest SATD value, and mapping the intra prediction mode with the smallest SATD value to a regular intra prediction mode; and determining the regular intra prediction mode as the first intra prediction mode of the target block.

13. The apparatus according to clause 10, wherein in obtaining the final predictor of the target by weighted averaging the intra predictor of the target block and inter predictor of the target block, the one or more processors are further configured to execute the instructions to cause the apparatus to perform:

in response to the first intra prediction mode being an angular mode, determining an intra weight and an inter weight based on the first intra prediction mode; and obtaining the final predictor of the target block by weighted averaging the intra predictor of the target block and inter predictor of the target block with the intra weight and inter weight, respectively.

14. The apparatus according to clause 13, wherein in determining the intra weight and inter weight based on the first intra prediction mode, the one or more processors are further configured to execute the instructions to cause the apparatus to perform:

dividing the target block into a plurality of sub-blocks, wherein the target block is divided vertically when an angular mode index of the first intra prediction mode is less than a preset value, or the target block is divided horizontally when the angular mode index of the first intra prediction mode is equal to or greater than the preset value; and determining a sub-intra weight and a sub-inter weight for each of the plurality of sub-blocks; and wherein obtaining the final predictor of the target block by weighted averaging the intra predictor of the target block and inter predictor of the target block further comprises:

determining a plurality of sub-final predictors associated with the plurality of sub-blocks, respectively, wherein each of the plurality of sub-final predictors is determined by weighted averaging the intra predictor and inter predictor with the sub-intra weight and sub-inter weight for the respective sub-block;

determining a sum of the plurality of sub-final predictors; and obtaining the final predictor by right-shifting a number of bits, wherein the number of bits is obtained by logarithm of a sum of the sub-intra weight and the sub-inter weight.

15. The apparatus according to clause 14, wherein:

the target block is divided vertically into four equally sized sub-blocks when the angular mode index of the first intra prediction mode is equal to or greater than an angular mode index of the diagonal mode from bottom left to top right and less than an angular mode index of the diagonal mode from top left to bottom right, or the target block is divided horizontally into four equally sized sub-blocks when the angular mode index of the first intra prediction mode is equal to or greater than the angular mode index of the diagonal mode from top left to bottom right and equal to or less than an angular mode index of the diagonal mode from top right to bottom left;

the four equally sized sub-blocks include a first sub-block, a second sub-block, a third sub-block and a fourth sub-block, the first, second, third, and fourth sub-blocks being arranged respectively: from left to right when the target block is divided vertically, or from top to bottom when the target block is divided horizontally; and the sub-intra weight and sub-inter weight for the first sub-block are 6 and 2, respectively;

the sub-intra weight and sub-inter weight for the second sub-block are 5 and 3, respectively;

the sub-intra weight and sub-inter weight for the third sub-block are 3 and 5, respectively; and the sub-intra weight and sub-inter weight for the fourth sub-block are 2 and 6, respectively.

16. The apparatus according to any one of clauses 10 to 15, wherein in determining the first intra prediction mode of the target block using the TIMD method, the one or more processors are further configured to execute the instructions to cause the apparatus to perform:

when the target block has a size less than or equal to a threshold, determining the first intra prediction mode of the target block using the TIMD method; and when the target block has a size greater than a threshold, determining the first intra prediction mode of the target block as the Planar mode.

17. The apparatus according to clause 16, wherein the threshold is equal to 1024.

18. The apparatus according to any one of clauses 10 to 17, the one or more processors are further configured to execute the instructions to cause the apparatus to perform:

setting a planar mode as a propagated intra prediction mode; and constructing a most probable mode (MPM) list for a neighboring block of the target block with the propagated intra prediction mode.

19. A non-transitory computer readable medium that stores a set of instructions that is executable by one or more processors of an apparatus to cause the apparatus to initiate a method for performing combined inter and intra prediction (CIIP), the method comprising:

determining the CIIP being enabled for a target block;

determining a first intra prediction mode of the target block using a template-based intra mode derivation (TIMD) method;

generating an intra predictor of the target block with the first intra prediction mode; and obtaining a final predictor of the target block by weighted averaging the intra predictor of the target block and the inter predictor of the target block.

20. The non-transitory computer readable medium according to clause 19, wherein determining the first intra prediction mode of the target block using the TIMD method further comprises:

calculating values of sum of absolute transformed differences (SATD) of the target block associated respectively with a plurality of intra prediction modes in a TIMD mode list; and determining, among the plurality of intra prediction modes, an intra prediction mode with a smallest SATD value as the first intra prediction mode of the target block.

21. The non-transitory computer readable medium according to clause 19, wherein determining the first intra prediction mode of the target block using the TIMD method further comprises:

calculating values of SATD of the target block associated respectively with a plurality of intra prediction modes in a TIMD mode list;

determining, among the plurality of intra prediction modes, an intra prediction mode with a smallest SATD value, and mapping the intra prediction mode with the smallest SATD value to a regular intra prediction mode; and determining the regular intra prediction mode as the first intra prediction mode of the target block.

22. The non-transitory computer readable medium according to clause 19, wherein obtaining the final predictor of the target by weighted averaging the intra predictor of the target block and inter predictor of the target block further comprises:

in response to the first intra prediction mode being an angular mode, determining an intra weight and an inter weight based on the first intra prediction mode; and obtaining the final predictor of the target block by weighted averaging the intra predictor of the target block and inter predictor of the target block with the intra weight and inter weight, respectively.

23. The non-transitory computer readable medium according to clause 22, wherein determining the intra weight and inter weight based on the first intra prediction mode further comprises:

dividing the target block into a plurality of sub-blocks, wherein the target block is divided vertically when an angular mode index of the first intra prediction mode is less than a preset value, or the target block is divided horizontally when the angular mode index of the first intra prediction mode is equal to or greater than the preset value; and determining a sub-intra weight and a sub-inter weight for each of the plurality of sub-blocks; and wherein obtaining the final predictor of the target block by weighted averaging the intra predictor of the target block and inter predictor of the target block further comprises:

determining a plurality of sub-final predictors associated with the plurality of sub-blocks, respectively, wherein each of the plurality of sub-final predictors is determined by weighted averaging the intra predictor and inter predictor with the sub-intra weight and sub-inter weight for the respective sub-block;

determining a sum of the plurality of sub-final predictors; and obtaining the final predictor by right-shifting a number of bits, wherein the number of bits is obtained by logarithm of a sum of the sub-intra weight and the sub-inter weight.

24. The non-transitory computer readable medium according to clause 23, wherein:

the target block is divided vertically into four equally sized sub-blocks when the angular mode index of the first intra prediction mode is equal to or greater than an angular mode index of the diagonal mode from bottom left to top right and less than an angular mode index of the diagonal mode from top left to bottom right, or the target block is divided horizontally into four equally sized sub-blocks when the angular mode index of the first intra prediction mode is equal to or greater than the angular mode index of the diagonal mode from top left to bottom right and equal to or less than an angular mode index of the diagonal mode from top right to bottom left;

the four equally sized sub-blocks include a first sub-block, a second sub-block, a third sub-block and a fourth sub-block, the first, second, third, and fourth sub-blocks being arranged respectively: from left to right when the target block is divided vertically, or from top to bottom when the target block is divided horizontally; and the sub-intra weight and sub-inter weight for the first sub-block are 6 and 2, respectively;

the sub-intra weight and sub-inter weight for the second sub-block are 5 and 3, respectively;

the sub-intra weight and sub-inter weight for the third sub-block are 3 and 5, respectively; and the sub-intra weight and sub-inter weight for the fourth sub-block are 2 and 6, respectively.

25. The non-transitory computer readable medium according to any one of clauses 19 to 24, wherein determining the first intra prediction mode of the target block using the TIMD method further comprises:

when the target block has a size less than or equal to a threshold, determining the first intra prediction mode of the target block using the TIMD method; and when the target block has a size greater than a threshold, determining the first intra prediction mode of the target block as the Planar mode.

26. The non-transitory computer readable medium according to clause 25, wherein the threshold is equal to 1024.

27. The non-transitory computer readable medium according to any one of clauses 19 to 26, wherein the method further comprises:

setting a planar mode as a propagated intra prediction mode; and constructing a most probable mode (MPM) list for a neighboring block of the target block with the propagated intra prediction mode.

28. A method for performing combined inter and intra prediction (CIIP), comprising:

determining a first intra prediction mode of a target block using a template-based intra mode derivation (TIMD) method;

generating an intra predictor of the target block with the first intra prediction mode;

obtaining a final predictor of the target block by weighted averaging the intra predictor of the target block and an inter predictor of the target block; and signaling a flag indicating the CIIP being enabled and an index indicating the TIMD method is used for determining the first intra prediction mode of the target block.

29. The method according to clause 28, wherein determining the first intra prediction mode of the target block using the TIMD method further comprises:

calculating values of sum of absolute transformed differences (SATD) of the target block associated respectively with a plurality of intra prediction modes in a TIMD mode list; and determining, among the plurality of intra prediction modes, an intra prediction mode with a smallest SATD value as the first intra prediction mode of the target block.

30. The method according to claim 28, wherein determining the first intra prediction mode of the target block using the TIMD method further comprises:

calculating values of SATD of the target block associated respectively with a plurality of intra prediction modes in a TIMD mode list;

determining, among the plurality of intra prediction modes, an intra prediction mode with a smallest SATD value, and mapping the intra prediction mode with the smallest SATD value to a regular intra prediction mode; and determining the regular intra prediction mode as the first intra prediction mode of the target block.

31. The method according to clause 28, wherein obtaining the final predictor of the target by weighted averaging the intra predictor of the target block and the inter predictor of the target block further comprises:

in response to the first intra prediction mode being an angular mode, determining an intra weight and an inter weight based on the first intra prediction mode; and obtaining the final predictor of the target block by weighted averaging the intra predictor of the target block and the inter predictor of the target block with the intra weight and the inter weight, respectively.

32. The method according to clause 31, wherein determining the intra weight and the inter weight based on the first intra prediction mode further comprises:

dividing the target block into a plurality of sub-blocks, wherein the target block is divided vertically when an angular mode index of the first intra prediction mode is less than a preset value, or the target block is divided horizontally when the angular mode index of the first intra prediction mode is equal to or greater than the preset value; and determining a sub-intra weight and a sub-inter weight for each of the plurality of sub-blocks; and wherein obtaining the final predictor of the target block by weighted averaging the intra predictor of the target block and the inter predictor of the target block further comprises:

determining a plurality of sub-final predictors associated with the plurality of sub-blocks, respectively, wherein each of the plurality of sub-final predictors is determined by weighted averaging the intra predictor and inter predictor with the sub-intra weight and sub-inter weight for the respective sub-block;

determining a sum of the plurality of sub-final predictors; and obtaining the final predictor by right-shifting a number of bits, wherein the number of bits is obtained by logarithm of a sum of the sub-intra weight and the sub-inter weight.

33. The method according to clause 32, wherein:

the target block is divided vertically into four equally sized sub-blocks when the angular mode index of the first intra prediction mode is equal to or greater than an angular mode index of the diagonal mode from bottom left to top right and less than an angular mode index of the diagonal mode from top left to bottom right, or the target block is divided horizontally into four equally sized sub-blocks when the angular mode index of the first intra prediction mode is equal to or greater than the angular mode index of the diagonal mode from top left to bottom right and equal to or less than an angular mode index of the diagonal mode from top right to bottom left;

the four equally sized sub-blocks include a first sub-block, a second sub-block, a third sub-block and a fourth sub-block, the first, second, third, and fourth sub-blocks being arranged respectively: from left to right when the target block is divided vertically, or from top to bottom when the target block is divided horizontally; and the sub-intra weight and sub-inter weight for the first sub-block are 6 and 2, respectively;

the sub-intra weight and sub-inter weight for the second sub-block are 5 and 3, respectively;

the sub-intra weight and sub-inter weight for the third sub-block are 3 and 5, respectively; and the sub-intra weight and sub-inter weight for the fourth sub-block are 2 and 6, respectively.

34. The method according to any one of clauses 28 to 33, wherein determining the first intra prediction mode of the target block using the TIMD method further comprises:

when the target block has a size less than or equal to a threshold, determining the first intra prediction mode of the target block using the TIMD method; and when the target block has a size greater than a threshold, determining the first intra prediction mode of the target block as the Planar mode.

35. The method according to clause 34, wherein the threshold is equal to 1024.

36. The method according to any one of clauses 28 to 35, further comprising:

setting a planar mode as a propagated intra prediction mode; and constructing a most probable mode (MPM) list for a neighboring block of the target block with the propagated intra prediction mode.

37. A non-transitory computer readable medium storing a bitstream, wherein the bitstream comprises a flag and a first index associated with encoded video data, the flag indicating an inter and intra prediction (CIIP) is used for the encoded video data, and the first index indicating a template-based intra mode derivation (TIMD) method used for the CIIP, wherein the flag and the index causes a decoder to:

determine a first intra prediction mode of a target block using the TIMD method;

generate an intra predictor of the target block with the intra prediction mode; and obtain a final predictor of the target block by weighted averaging the intra predictor of the target block and an inter predictor of the target block.

38. The non-transitory computer readable medium according to clause 37, wherein the bitstream further comprises an angular mode index associated with the video data, wherein the angular mode index causes a decoder to:

divide the target block into a plurality of sub-blocks, wherein the target block is divided vertically when the angular mode index of the first intra prediction mode is less than a preset value, or the target block is divided horizontally when the angular mode index of the first intra prediction mode is equal to or greater than the preset value; and determine a sub-intra weight and a sub-inter weight for each of the plurality of sub-blocks;

determine a plurality of sub-final predictors associated with the plurality of sub-blocks, respectively, wherein each of the plurality of sub-final predictors is determined by weighted averaging the intra predictor and the inter predictor with the sub-intra weight and sub-inter weight for the respective sub-block;

determine a sum of the plurality of sub-final predictors; and obtain the final predictor by right-shifting a number of bits, wherein the number of bits is obtained by logarithm of a sum of the sub-intra weight and the sub-inter weight.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A method for performing combined inter and intra prediction (CIIP), comprising:
   determining the CIIP being enabled for a target block;
   determining a first intra prediction mode of the target block using a template-based intra mode derivation (TIMD) method;
   generating an intra predictor of the target block with the first intra prediction mode; and
   obtaining a final predictor of the target block by weighted averaging the intra predictor of the target block and an inter predictor of the target block;
   wherein obtaining the final predictor of the target by weighted averaging the intra predictor of the target block and the inter predictor of the target block further comprises:
   in response to the first intra prediction mode being an angular mode, determining an intra weight and an inter weight based on the first intra prediction mode; and
   obtaining the final predictor of the target block by weighted averaging the intra predictor of the target block and the inter predictor of the target block with the intra weight and the inter weight, respectively;
   wherein determining the intra weight and the inter weight based on the first intra prediction mode further comprises:
      dividing the target block into a plurality of sub-blocks, wherein the target block is divided vertically when an angular mode index of the first intra prediction mode is less than a preset value, or the target block is divided horizontally when the angular mode index of the first intra prediction mode is equal to or greater than the preset value; and
      determining a sub-intra weight and a sub-inter weight for each of the plurality of sub-blocks; and
   wherein obtaining the final predictor of the target block by weighted averaging the intra predictor of the target block and the inter predictor of the target block further comprises:
      determining a plurality of sub-final predictors associated with the plurality of sub-blocks, respectively, wherein each of the plurality of sub-final predictors is determined by weighted averaging the intra predictor and the inter predictor with the sub-intra weight and sub-inter weight for the respective sub-block;
      determining a sum of the plurality of sub-final predictors; and
      obtaining the final predictor by right-shifting a number of bits, wherein the number of bits is obtained by logarithm of a sum of the sub-intra weight and the sub-inter weight.

2. The method according to claim 1, wherein determining the first intra prediction mode of the target block using the TIMD method further comprises:
   calculating values of sum of absolute transformed differences (SATD) of the target block associated respectively with a plurality of intra prediction modes in a TIMD mode list; and
   determining, among the plurality of intra prediction modes, an intra prediction mode with a smallest SATD value as the first intra prediction mode of the target block.

3. The method according to claim 1, wherein determining the first intra prediction mode of the target block using the TIMD method further comprises:
   calculating values of SATD of the target block associated respectively with a plurality of intra prediction modes in a TIMD mode list;
   determining, among the plurality of intra prediction modes, an intra prediction mode with a smallest SATD value, and mapping the intra prediction mode with the smallest SATD value to a regular intra prediction mode; and
   determining the regular intra prediction mode as the first intra prediction mode of the target block.

4. The method according to claim 1, wherein:
   the target block is divided vertically into four equally sized sub-blocks when the angular mode index of the first intra prediction mode is equal to or greater than an angular mode index of a diagonal mode from bottom left to top right and less than an angular mode index of the diagonal mode from top left to bottom right, or the target block is divided horizontally into four equally sized sub-blocks when the angular mode index of the first intra prediction mode is equal to or greater than the angular mode index of the diagonal mode from top left to bottom right and equal to or less than an angular mode index of the diagonal mode from top right to bottom left;
   the four equally sized sub-blocks include a first sub-block, a second sub-block, a third sub-block and a fourth sub-block, the first, second, third, and fourth sub-blocks being arranged respectively: from left to right when the target block is divided vertically, or from top to bottom when the target block is divided horizontally; and
   the sub-intra weight and sub-inter weight for the first sub-block are 6 and 2, respectively;
   the sub-intra weight and sub-inter weight for the second sub-block are 5 and 3, respectively;
   the sub-intra weight and sub-inter weight for the third sub-block are 3 and 5, respectively; and
   the sub-intra weight and sub-inter weight for the fourth sub-block are 2 and 6, respectively.

5. The method according to claim 1, wherein determining the first intra prediction mode of the target block using the TIMD method further comprises:
   when the target block has a size less than or equal to a threshold, determining the first intra prediction mode of the target block using the TIMD method; and
   when the target block has a size greater than a threshold, determining the first intra prediction mode of the target block as a Planar mode.

6. The method according to claim 5, wherein the threshold is equal to 1024.

7. The method according to claim 1, further comprising:
   setting a planar mode as a propagated intra prediction mode; and
   constructing a most probable mode (MPM) list for a neighboring block of the target block with the propagated intra prediction mode.

8. A method for performing combined inter and intra prediction (CIIP), comprising:
- determining a first intra prediction mode of a target block using a template-based intra mode derivation (TIMD) method;
- generating an intra predictor of the target block with the first intra prediction mode;
- obtaining a final predictor of the target block by weighted averaging the intra predictor of the target block and an inter predictor of the target block; and
- signaling a flag indicating the CIIP being enabled and an index indicating the TIMD method is used for determining the first intra prediction mode of the target block;
- wherein obtaining the final predictor of the target by weighted averaging the intra predictor of the target block and the inter predictor of the target block further comprises:
  - in response to the first intra prediction mode being an angular mode, determining an intra weight and an inter weight based on the first intra prediction mode; and
  - obtaining the final predictor of the target block by weighted averaging the intra predictor of the target block and the inter predictor of the target block with the intra weight and the inter weight, respectively;
- wherein determining the intra weight and the inter weight based on the first intra prediction mode further comprises:
  - dividing the target block into a plurality of sub-blocks, wherein the target block is divided vertically when an angular mode index of the first intra prediction mode is less than a preset value, or the target block is divided horizontally when the angular mode index of the first intra prediction mode is equal to or greater than the preset value; and
  - determining a sub-intra weight and a sub-inter weight for each of the plurality of sub-blocks; and
- wherein obtaining the final predictor of the target block by weighted averaging the intra predictor of the target block and the inter predictor of the target block further comprises:
  - determining a plurality of sub-final predictors associated with the plurality of sub-blocks, respectively, wherein each of the plurality of sub-final predictors is determined by weighted averaging the intra predictor and the inter predictor with the sub-intra weight and sub-inter weight for the respective sub-block;
  - determining a sum of the plurality of sub-final predictors; and
  - obtaining the final predictor by right-shifting a number of bits, wherein the number of bits is obtained by logarithm of a sum of the sub-intra weight and the sub-inter weight.

9. The method according to claim 8, wherein determining the first intra prediction mode of the target block using the TIMD method further comprises:
- calculating values of sum of absolute transformed differences (SATD) of the target block associated respectively with a plurality of intra prediction modes in a TIMD mode list; and
- determining, among the plurality of intra prediction modes, an intra prediction mode with a smallest SATD value as the first intra prediction mode of the target block.

10. The method according to claim 8, wherein determining the first intra prediction mode of the target block using the TIMD method further comprises:
- calculating values of SATD of the target block associated respectively with a plurality of intra prediction modes in a TIMD mode list;
- determining, among the plurality of intra prediction modes, an intra prediction mode with a smallest SATD value, and mapping the intra prediction mode with the smallest SATD value to a regular intra prediction mode; and
- determining the regular intra prediction mode as the first intra prediction mode of the target block.

11. The method according to claim 8, wherein:
- the target block is divided vertically into four equally sized sub-blocks when the angular mode index of the first intra prediction mode is equal to or greater than an angular mode index of a diagonal mode from bottom left to top right and less than an angular mode index of the diagonal mode from top left to bottom right, or the target block is divided horizontally into four equally sized sub-blocks when the angular mode index of the first intra prediction mode is equal to or greater than the angular mode index of the diagonal mode from top left to bottom right and equal to or less than an angular mode index of the diagonal mode from top right to bottom left;
- the four equally sized sub-blocks include a first sub-block, a second sub-block, a third sub-block and a fourth sub-block, the first, second, third, and fourth sub-blocks being arranged respectively: from left to right when the target block is divided vertically, or from top to bottom when the target block is divided horizontally; and
- the sub-intra weight and sub-inter weight for the first sub-block are 6 and 2, respectively;
- the sub-intra weight and sub-inter weight for the second sub-block are 5 and 3, respectively;
- the sub-intra weight and sub-inter weight for the third sub-block are 3 and 5, respectively; and
- the sub-intra weight and sub-inter weight for the fourth sub-block are 2 and 6, respectively.

12. The method according to claim 8, wherein determining the first intra prediction mode of the target block using the TIMD method further comprises:
- when the target block has a size less than or equal to a threshold, determining the first intra prediction mode of the target block using the TIMD method; and
- when the target block has a size greater than a threshold, determining the first intra prediction mode of the target block as a Planar mode.

13. The method according to claim 12, wherein the threshold is equal to 1024.

14. The method according to claim 8, further comprising:
- setting a planar mode as a propagated intra prediction mode; and
- constructing a most probable mode (MPM) list for a neighboring block of the target block with the propagated intra prediction mode.

15. A non-transitory computer readable medium storing a bitstream, wherein the bitstream comprises a flag and a first index associated with encoded video data, the flag indicating an inter and intra prediction (CIIP) is used for the encoded video data, and the first index indicating a template-based intra mode derivation (TIMD) method used for the CIIP, wherein the flag and the index cause a decoder to:

determine a first intra prediction mode of a target block using the TIMD method;
generate an intra predictor of the target block with the intra prediction mode; and
obtain a final predictor of the target block by weighted averaging the intra predictor of the target block and an inter predictor of the target block;
wherein the bitstream further comprises an angular mode index associated with the video data, and the angular mode index cause the decoder to:
determine an intra weight and an inter weight based on the first intra prediction mode; and
obtain the final predictor of the target block by weighted averaging the intra predictor of the target block and the inter predictor of the target block with the intra weight and the inter weight, respectively; wherein the angular mode index further causes the decoder to:
divide the target block into a plurality of sub-blocks, wherein the target block is divided vertically when the angular mode index of the first intra prediction mode is less than a preset value, or the target block is divided horizontally when the angular mode index of the first intra prediction mode is equal to or greater than the preset value; and
determine a sub-intra weight and a sub-inter weight for each of the plurality of sub-blocks;
determine a plurality of sub-final predictors associated with the plurality of sub-blocks, respectively, wherein each of the plurality of sub-final predictors is determined by weighted averaging the intra predictor and the inter predictor with the sub-intra weight and sub-inter weight for the respective sub-block;
determine a sum of the plurality of sub-final predictors; and
obtain the final predictor by right-shifting a number of bits, wherein the number of bits is obtained by logarithm of a sum of the sub-intra weight and the sub-inter weight.

16. The non-transitory computer readable medium according to claim 15, wherein the angular mode index causes the decoder to:
vertically divide the target block into four equally sized sub-blocks when the angular mode index of the first intra prediction mode is equal to or greater than an angular mode index of a diagonal mode from bottom left to top right and less than an angular mode index of the diagonal mode from top left to bottom right, or horizontally divide the target block into four equally sized sub-blocks when the angular mode index of the first intra prediction mode is equal to or greater than the angular mode index of the diagonal mode from top left to bottom right and equal to or less than an angular mode index of the diagonal mode from top right to bottom left;
wherein the four equally sized sub-blocks include a first sub-block, a second sub-block, a third sub-block and a fourth sub-block, the first, second, third, and fourth sub-blocks being arranged respectively: from left to right when the target block is divided vertically, or from top to bottom when the target block is divided horizontally; and
the sub-intra weight and sub-inter weight for the first sub-block are 6 and 2, respectively;
the sub-intra weight and sub-inter weight for the second sub-block are 5 and 3, respectively;
the sub-intra weight and sub-inter weight for the third sub-block are 3 and 5, respectively; and
the sub-intra weight and sub-inter weight for the fourth sub-block are 2 and 6, respectively.

* * * * *